United States Patent
Miura

(10) Patent No.: US 7,383,472 B2
(45) Date of Patent: Jun. 3, 2008

(54) DISK ARRAY SUBSYSTEM

(75) Inventor: Sumihiro Miura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 555 days.

(21) Appl. No.: 11/028,243

(22) Filed: Jan. 4, 2005

(65) Prior Publication Data

US 2006/0101304 A1    May 11, 2006

(30) Foreign Application Priority Data

Nov. 9, 2004  (JP) ............................ 2004-324560

(51) Int. Cl.
*G06F 11/00* (2006.01)
(52) U.S. Cl. .................. 714/42; 714/7; 714/8
(58) Field of Classification Search ............. 714/7, 714/8, 42
See application file for complete search history.

(56) References Cited

U.S. PATENT DOCUMENTS

| | | | | |
|---|---|---|---|---|
| 5,627,990 | A * | 5/1997 | Cord et al. ................. | 711/122 |
| 6,223,309 | B1 * | 4/2001 | Dixon et al. ................ | 714/703 |
| 6,848,063 | B2 * | 1/2005 | Rodeheffer et al. ........... | 714/6 |
| 2002/0013881 | A1 * | 1/2002 | Delp et al. ................... | 711/105 |
| 2002/0065984 | A1 * | 5/2002 | Thompson et al. ......... | 711/114 |
| 2003/0097608 | A1 * | 5/2003 | Rodeheffer et al. ........... | 714/7 |
| 2005/0058008 | A1 * | 3/2005 | Auclair et al. .............. | 365/232 |
| 2005/0080988 | A1 * | 4/2005 | Teng .......................... | 711/106 |
| 2005/0081085 | A1 * | 4/2005 | Ellis et al. ..................... | 714/5 |
| 2005/0120268 | A1 * | 6/2005 | Barr et al. .................... | 714/25 |
| 2005/0188009 | A1 * | 8/2005 | McKinney et al. ......... | 709/203 |

FOREIGN PATENT DOCUMENTS

JP          08-212145          2/1995

\* cited by examiner

*Primary Examiner*—Bryce P Bonzo
(74) *Attorney, Agent, or Firm*—Reed Smith LLP; Stanley P. Fisher, Esq.; Juan Carlos A. Marquez, Esq.

(57) ABSTRACT

A disk array subsystem makes a diagnosis of a memory device while maintaining performance of a normal access to the memory device contained in a controller, thus enhancing reliability of the memory data. In the disk array subsystem having a disk drive and a controller, the controller has a cache unit and the cache unit has a memory device and a memory control unit. The memory control unit monitors status of memory access by means of a memory access state monitoring unit, issues a diagnosis request while normal access is not made to the memory device, makes access to the memory device for diagnosis of the memory data, and checks the data read from the memory device by using ECC and detects a data error.

18 Claims, 12 Drawing Sheets

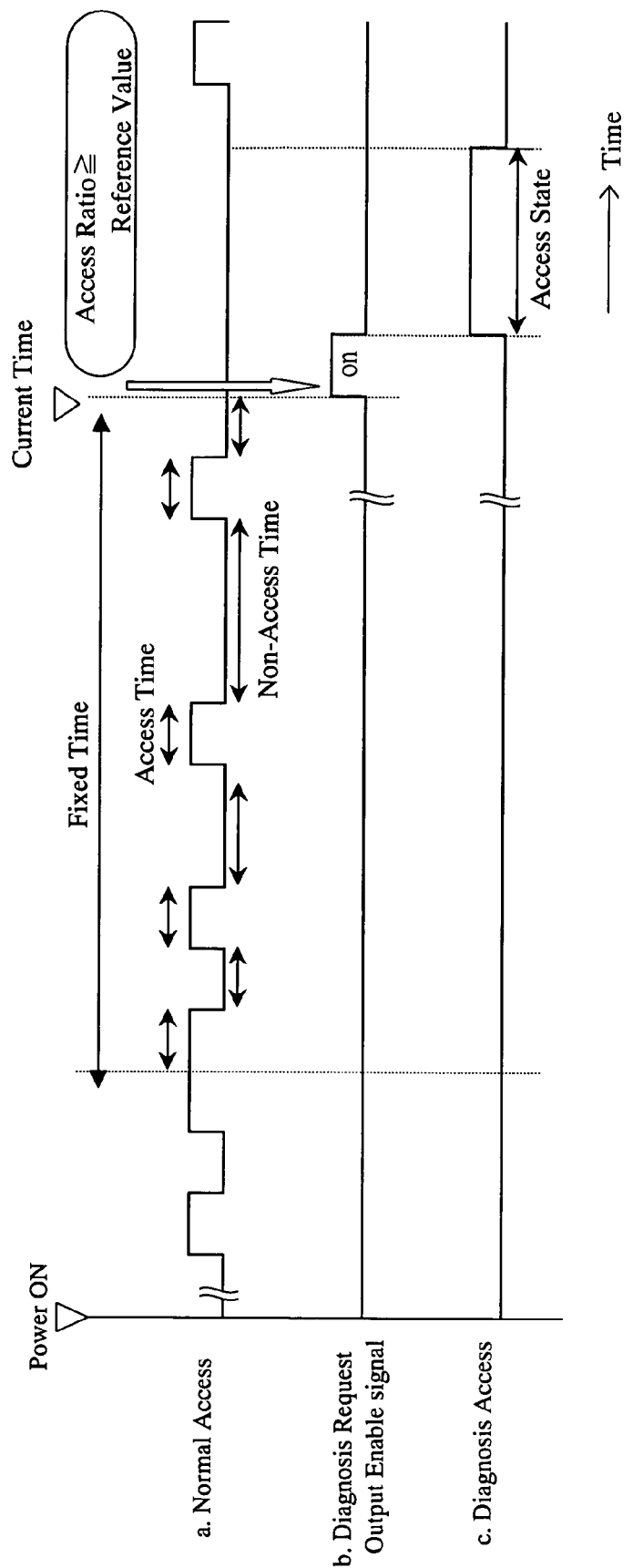

DISK ARRAY SUBSYSTEM

CROSS-REFERENCE TO RELATED APPLICATION

The present application claims priority from Japanese patent application No. JP 2004-324560 filed on Nov. 9, 2004, the content of which is hereby incorporated by reference into this application.

BACKGROUND OF THE INVENTION

The present invention relates to a disk array subsystem, which has a storage device such as a hard disk drive (HDD) and a controller that controls storing of data for a storage area provided by the storage device, and, more specifically, to a technique for making a diagnosis on a memory device contained in the controller.

The disk array subsystem uses a memory board (memory unit) on which a number of memory devices are mounted in its controller. The memory board typically includes a cache unit. For example, the memory device includes a SDRAM (Synchronous DRAM). The cache unit contained in the controller serves as a main memory of the controller and stores processed data. In a normal access operation of the disk array subsystem, the cache unit in the controller executes a data input/output between a host unit communicably connected to the controller and a HDD, wherein the cache unit is used to temporarily store transfer data. For example, in the normal access, when the controller reads/writes data from/to the storage area in the HDD in accordance with a request from the host unit, an access is made to a memory device in the cache unit to store the read/write data, etc. Note that, in the technique for the disk array subsystem, the memory device of the memory unit provided in the controller and the storage device such as an HDD, which is connected to the controller and is an object of RAID control, are different from each other in role and performance demanded by them.

In order to realize improved performance of the disk array subsystem, enhancement of reliability of data to be stored in the memory device contained in the controller is strongly demanded. Therefore, it is requested to make diagnoses of, by some means, whether data in the memory device is normal without any failures and/or whether input/output signals to the memory device are stable, etc.

Meanwhile, when the disk array subsystems are shipped to factories, there are made tests of confirming normal operations by fluctuating temperatures and/or voltages of the subsystem. In particular, the cache unit is subjected to a margin test of confirming the normal operations by fluctuating a characteristic such as voltage within a range of operational specification.

Japan patent Laid-open No. 8-212145 discloses a memory diagnosis technique in which test data is retained and such data and test data read from memory are compared.

SUMMARY OF THE INVENTION

The disk array subsystem is required to have a function of making a diagnosis of the memory device in order to improve reliability of data in the memory device contained in the controller. In particular, there is a possibility that the future memory device in comparison with the conventional one will have the memory in which a number of failures occur in the normal operation because of aged deterioration etc. influenced by downsizing of memory cells as they are made high capacity. Therefore, by assuming such a case, it is required to have a function of detecting in advance some failures in the memory data by performing a diagnosis operation to the memory device.

It is also required to maintain the normal performance of access with respect to the memory device while the diagnosis is made on the memory device. In a conventional diagnosis method, since a data read command is transmitted to the memory device in the cache unit and the content of the read data is checked by a processor and a program in the controller, it has been possible to make the diagnosis of the data in the memory device by software.

However, in the conventional diagnosis method, if the memory access for the diagnosis by a certain processor in the controller is made, an operation for the normal memory access by other processors is affected due to the above memory access and this leads to performance deterioration of the disk array subsystem. That is, if a request for using the memory access for diagnosis and that for normal operation occurs on the same path, performance of data transfer throughput in the normal access operation degrades due to access contention on the path. Thus, it is difficult to diagnose the stored data on the entire surface, i.e., on all the addresses of the memory device during the normal operation. In addition, when the diagnosis by software is made, the margin test cannot be conducted although data failure can be checked. Conventionally, there has not been provided the disk array subsystem having a function of being capable of executing the margin test during the normal operation.

In addition, if the technique described in Japan Patent Laid-open No. 8-212145 is applied to the disk array subsystem, it has been found out that the contention between the normal memory access and the memory access for diagnosis occurs and the thereby the performance of the normal operation deteriorates similarly to the above-mentioned diagnosis method.

In view of the above problems, the present invention has been made. An object thereof is to provide a technique of the disk array subsystem, which can make the diagnosis on the memory device while the normal access performance is maintained to the memory devices in the controller and which enhance reliability of data to be stored in the memory device.

Outlines of representative ones of the inventions disclosed by the present application will be briefly described as follows. In order to achieve the object, a disk array subsystem according to the present invention has a storage device such as an HDD and a controller that controls data storage to the storage device, and is capable of controlling a RAID, thereby being characterized by the following technical means:

(1) A disk array subsystem according to the present invention has a memory unit such as a cache unit in a controller, the memory unit being configured to have a memory device such as a SDRAM, and a memory control unit such as a memory control circuit that controls a data input/output to/from the memory device. The memory unit is incorporated in the form of a memory board, for example, and is configured so that the memory devices can be connected to the memory board so as to increase and/or decrease in umber. In a normal access to the memory unit in the controller, a memory access command etc. is sent from a processing unit contained in the controller such as an interface unit with a host unit (channel control unit) or an interface unit with the storage device (disk control unit) etc. to the memory unit, by a path.

In this configuration, a means of making a diagnosis of the memory device (first diagnosis means) is provided in the memory unit. The first means is implemented by hardware logic as a diagnosis function of making an access to the memory device for automatic diagnosis thereof, in the memory control circuit within the memory unit, in particular. While the disk array subsystem is operated, in the memory unit the first means makes the access for the automatic diagnosis to the memory device with such timing as not to harm the normal access and as to execute the diagnosis and checks the data stored in the memory device, while the controller makes a normal access such as data read/write etc. to the memory device in the memory unit.

The first diagnosis means controls the timing of making the diagnosis access so as to execute the diagnosis in a state in which the normal access to the memory device is not made (referred to as "non-memory access state"). The first diagnosis means monitors a memory access state from the outside of the memory unit, and, based on recognition or judgment of the memory access state, makes the access to the memory device by a read command etc., for diagnosis of the data stored in the memory device during a time when the normal access to the memory device is not made (referred to as "non-memory access time"). Then, the first diagnosis means checks data read from the memory device, depending on the access for diagnosis of data failure (error), and detects the data failure, if any, by using some means such as an ECC (Error-Correcting Code).

That is, the non-memory access time is an unoccupied time that occurs while a normal access operation may be executed. By the memory control circuit, such a point in time as to be in a non-memory access state within the non-memory access time is set to execution timing of making the diagnosis access.

Monitoring of the memory access state is done by, for example, receiving at the memory control circuit a memory access command such as a read/write command etc. from a path external to the memory unit. The memory control circuit makes determination related to the non-memory access time and the execution timing for diagnosis, and recognizes the reliable unoccupied time based on the commands received at the memory control circuit, for example, or statistically foresees the non-memory access in accordance with access frequency in the memory access and the non-memory access or comparison of a processing time, etc.

The process in the diagnosis access includes, for example, the process for issuing a diagnosis request corresponding to a content or type of the diagnosis and outputting to the memory device a command and an address for diagnosis based on the diagnosis request when the memory access command is not received and based on the monitoring of the memory access state by the memory control circuit, and the process for checking the output data by such a means of the ECC etc. that is read at the memory device in accordance with the command and the address for diagnosis and is outputted to the memory control circuit as a response.

In the diagnosis process, in the configuration in which the checking is done by using the ECC, when data is to be written to the memory device, the memory control circuit generates the ECC for the write data, and writes to the memory device the data to which the ECC has been added. Then, in the diagnosis access, the memory control circuit reads from the memory device the data to which the ECC has been added, and checks the data with the ECC. If the memory control circuit detects an error in the checking, it reports an error status. If the error detected in the checking is correctable, the memory control circuit corrects the error and rewrites the corrected normal data to the memory device. If the error detected in the checking is not correctable, the memory control circuit reports the error status. The memory control circuit stores the error status in an error status storage register contained in the memory control circuit.

In the diagnosis access the first diagnosis means makes an access for diagnosis within the non-memory access time. Then, if the normal access takes place during the diagnosis processing corresponding to the diagnosis access, i.e., if the memory control circuit receives the memory access command corresponding to the normal access, the first diagnosis means preferentially executes the process of the normal access, by stopping the diagnosis processing then being executed.

More specifically, the memory control circuit is composed of: a bus for input/output and transfer of each piece of data of a command/address/data/status etc.; a buffer in which each piece of data is accumulated; a selector that changes a direction of each pieced of data; an analysis unit that analyzes a command/address associated with the access to the memory device; a monitoring unit (memory access state monitoring unit) that monitors the memory access state by receiving the analyzed commands and controls the execution timing of diagnosis; a memory command output unit that outputs to the memory device a normal command/address by inputting a command/address request from the analysis unit and also outputs to the memory device a command/address for diagnosis by inputting a diagnosis request from the monitoring unit; an ECC generating unit that generates/adds an ECC to the write data with respect to the memory device; an ECC error detection/correction unit that detects or corrects an error in the read data from the memory device or reports the error by using the ECC; and a register (error status storage register) that stores log information such as an error status related to diagnosis, etc.

(2) Similar to above item (1), a disk array subsystem according to this present invention has such configuration that a controller has a memory unit having a memory control unit such as a memory device and a memory control circuit, etc., wherein a means of making a diagnosis (second diagnosis means) including a margin test on the memory device is provided in the memory unit. The second diagnosis means is implemented by hardware logic as a function of making a diagnosis access to the memory device by an automatic margin test, in the memory control circuit within the memory unit, in particular. While the disk array subsystem is operated, in the memory unit the second diagnosis means automatically makes an access for diagnosis by the margin test with such timing as not to harm the normal access and as to check the data stored in the memory device while the controller makes a normal access such as data read/write etc. to the memory device in the memory unit.

In the non-memory access time, the second diagnosis means makes an access to the memory device and executes a margin test that fluctuates conditions or values of characteristics related to data input/output to/from the memory device such as amplitude etc., within a range of operation specification, checks a response corresponding to the fluctuation from the memory device, and detects an error due to shortage of margin within the operation specification or to deviation from a reference value etc. When accessing for the margin test, the second diagnosis means executes control for fluctuating the conditions or values for one or more characteristic related to the data input/output to/from the memory device. Then, the memory control circuit checks a response corresponding to the fluctuation from the memory device, and ensures normality or stability in the data input/output. The memory unit may be configured to comprise all of or only some of the functions necessary for controlling the fluctuation in respective characteristics.

For example, the characteristics subject to fluctuation control in the access for the margin test include amplitude of input/output signals in the data input/output between the memory control circuit and the memory device, a level of threshold (reference value), setting of DLL (Delay Locked Loop), frequency of a supply clock, a voltage level of power supply, an output buffer drive, and a termination resistance value, etc. The memory control circuit outputs a request or control signal for fluctuating the above characteristics to a portion of the memory device, or the memory device and the memory control unit, or other clock generating unit, and fluctuates the conditions or values.

The memory control circuit issues a diagnosis request with the execution timing of diagnosis based on the monitoring by the monitoring unit that monitors the memory access state, and, based on the diagnosis request received from the monitoring unit, the memory command output unit outputs a request or control signal for a margin test of various characteristics to the memory device or memory control circuit.

(3) A disk array subsystem according to the present invention has such a configuration that a controller has a memory unit having a memory control unit such as a memory device and a memory control circuit, etc., wherein a means of making a diagnosis (third diagnosis means) on the memory device is provided across the memory unit and the outside thereof. The controller is composed of, for example, the memory unit, the channel control unit, the disk control unit, and a processing unit such as a switching unit that connects respective processing units in the controller through a path. In a normal access to the memory unit by the processing unit in the controller, the channel control unit sends a memory access command etc. to the memory unit by using the path connected based on the control by the switching unit.

The third diagnosis means is implemented by hardware logic as a function of making an access for automatic diagnosis to the memory device, in a diagnosis control unit (memory access state monitoring/control unit) that is, in particular, provided external to the memory unit within the controller, monitors the memory access state and controls the memory access, and a memory control unit that makes the diagnosis access to the memory device in accordance with the control by the diagnosis control unit. In addition, the diagnosis control unit is provided as a portion to be connected to or built in the switching unit, in particular.

While the disk array subsystem is operated, the diagnosis control unit in the third diagnosis means automatically makes an access for diagnosis, through the switching unit, with such timing as not to harm the normal access, and checks the data stored in the memory device while the controller makes the normal access such as data read/write etc. to the memory device in the memory unit. The operation of checking the data stored in the memory device is carried out similarly to item (1) as described above, when the diagnosis control unit sends a diagnosis request to the memory control unit through the switching unit, for example, and the memory control unit makes the access to the memory device based on the diagnosis request.

Based on the condition of use of one or more path in the switching unit or the received memory access command, etc., the diagnosis control unit monitors the memory access state from the processing units within the controller. The diagnosis control unit determines a non-memory access time through the monitoring, and controls the execution timing of diagnosis. In addition, the diagnosis control unit controls the access from the switching unit to the memory unit in connection with the access for diagnosis.

In addition, the third diagnosis means automatically increases or decreases the frequency of access for diagnosis in accordance with conditions of the memory device of the memory unit or the memory access state, and controls increase/decrease of the frequency of normal access. That is, the diagnosis control unit makes the diagnosis access that has increased the frequency of issuing the diagnosis request to the corresponding memory device. Or, the third diagnosis means executes control in which the diagnosis of every kind is selected and executed based on the diagnosis request. Or, since configured to have one or more memory device, the third diagnosis means makes the diagnosis of a specific memory device or makes the diagnosis access only for predetermined duration.

When a memory device is newly added or replaced in the memory unit and then the new device is connected, for example, the third diagnosis means executes control in which it automatically strengthens the diagnosis, for a certain period of time, by increasing the diagnosis access to the newly connected memory device and suppressing the normal access accordingly.

Effects obtained by representative ones of the inventions disclosed by the present application will be briefly described as follows.

According to the present invention, by using the disk array subsystem, the diagnosis on the memory device contained in the controller can be made while the normal memory access performance is maintained to the memory device contained in the controller, and further reliability of the data stored in the memory device can be improved. This makes it possible to provide the disk array subsystem having the improved reliability.

With the item (1) described in the means of solving the problem, in particular, data in the memory device can be checked during the normal operation, any data failure can be detected in advance, and moreover the data can be recovered. In addition, with the item (2) described in the means of solving the problem, in particular, the margin test can be executed during the normal operation. In addition, with the item (3) described in the means of solving the problem, in particular, the diagnosis can be efficiently made by positively controlling access to the memory device.

BRIEF DESCRIPTION OF THE DRAWINGS

FIG. 7B is a time chart of execution of a diagnosis access corresponding to a processing illustrated in FIG. 4 to FIG. 6, in a cache unit in a disk array subsystem according to one embodiment of the present invention.

DESCRIPTION OF THE PREFERRED EMBODIMENTS

Hereinafter, embodiments of the present invention will be detailed based on the drawings.

First Embodiment

FIGS. 1 to 7 are views for explaining a disk array subsystem according to a first embodiment of the present invention. In the first embodiment, in a cache unit 1 having a memory device 3 in a controller 20, a memory control unit 2 is configured to have a function of automatically making diagnoses of data stored in the memory device 3 during a normal operation. The memory control unit 2 makes accesses to the memory device 3 in order to check normality of the stored data while normal memory accesses are not made. In the access for diagnosis, the memory control unit 2 not only detects an error with ECC by checking data read from the memory device 3 by a read command, but also executes a correct process if the error is correctable, and rewrites the corrected data to the memory device 3.

<Hardware Configuration>

Figure 1:
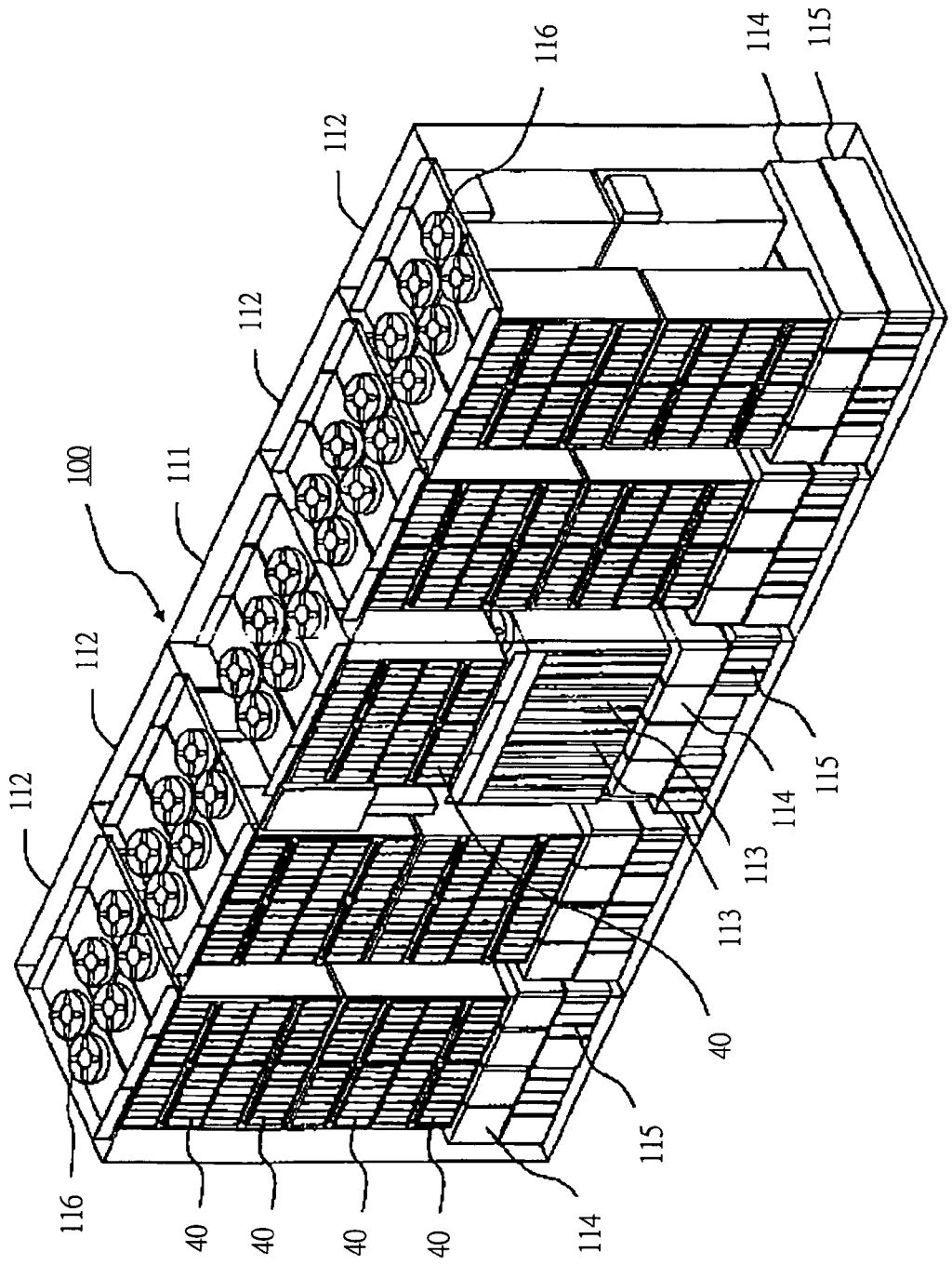
FIG. 1 is a perspective view showing an apparent configuration of overall hardware of a disk array subsystem according to one embodiment of the present invention.

FIG. 1 is a perspective view that shows the apparent configuration of the hardware of the disk array subsystem 100 according to the first embodiment of the present invention. The disk array subsystem 100 can be comprised by a basic chassis 111 and a plurality of additional chassis 112, for example. The basic chassis 111 is the minimum configuration unit of the disk array subsystem 100, and is equipped with both of a control function handled by controller 20 and a storage function handled by a storage device. The control function by the controller 20 is a function of controlling storage of data to the storage device in accordance with a command from a host unit etc. In the control function, RAID control over a plurality of storage devices is possible. The controller 20 is configured by interconnecting control packages 13 divided per function. The storage function is a function of storing data such as user data in a memory area. In the present embodiment, as a storage device, a disk drive 40 provides a memory area. The additional chassis 112 is an option of the disk array subsystem 100, includes a storage function, and is controlled by the control function of the basic chassis 111. For example, a configuration in which the four additional chassis 112 are connected to the basis chassis 111 is possible. Respective chassis are connected with each other by communications cables.

A plurality of control packages 113, a plurality of power source units 114, and a plurality of battery units 115, and a plurality of disk drives 40 are detachably provided in the basic chassis 111, respectively. A plurality of power supply units 114, a plurality of battery units 115, and a plurality of disk drives 40 are detachably provided in the additional chassis 112, respectively. A plurality of cooling fans 116 are also provided in the upper portions of the respective chassis. The power supply unit 114 supplies power to each section in the chassis. The battery units 115 serve as backup power supply. The cooling fans 116 cool down each interior of the chassis.

The control package 113 is a module for executing each processing unit such as a host interface unit (CHA) 30, a disk interface unit (DKA) 34, a cache unit 1, etc. as described later. The control packages 113 are configured so that a mechanical structure for installing the chassis is added to a board incorporating a function. In the basic chassis 111, as the control packages 113, a plurality of CHA packages, a plurality of DKA packages, and one or more memory package, etc. are detachably provided, respectively, and can be replaced in the units of the control package 113. Respective control packages 113 are inserted into slots provided in the chassis and connected to a backplane board for interconnection with respective sections, inside the slots.

In addition, in the disk array subsystem 100, an SVP (a service processors) (not shown) capable of maintaining/managing the disk array subsystem 100 is connected to the controller 20, whereby various types of maintenance/management tasks are allowed to be done through a processing for the SVP.

<Configuration of Functional Block>

Figure 2:
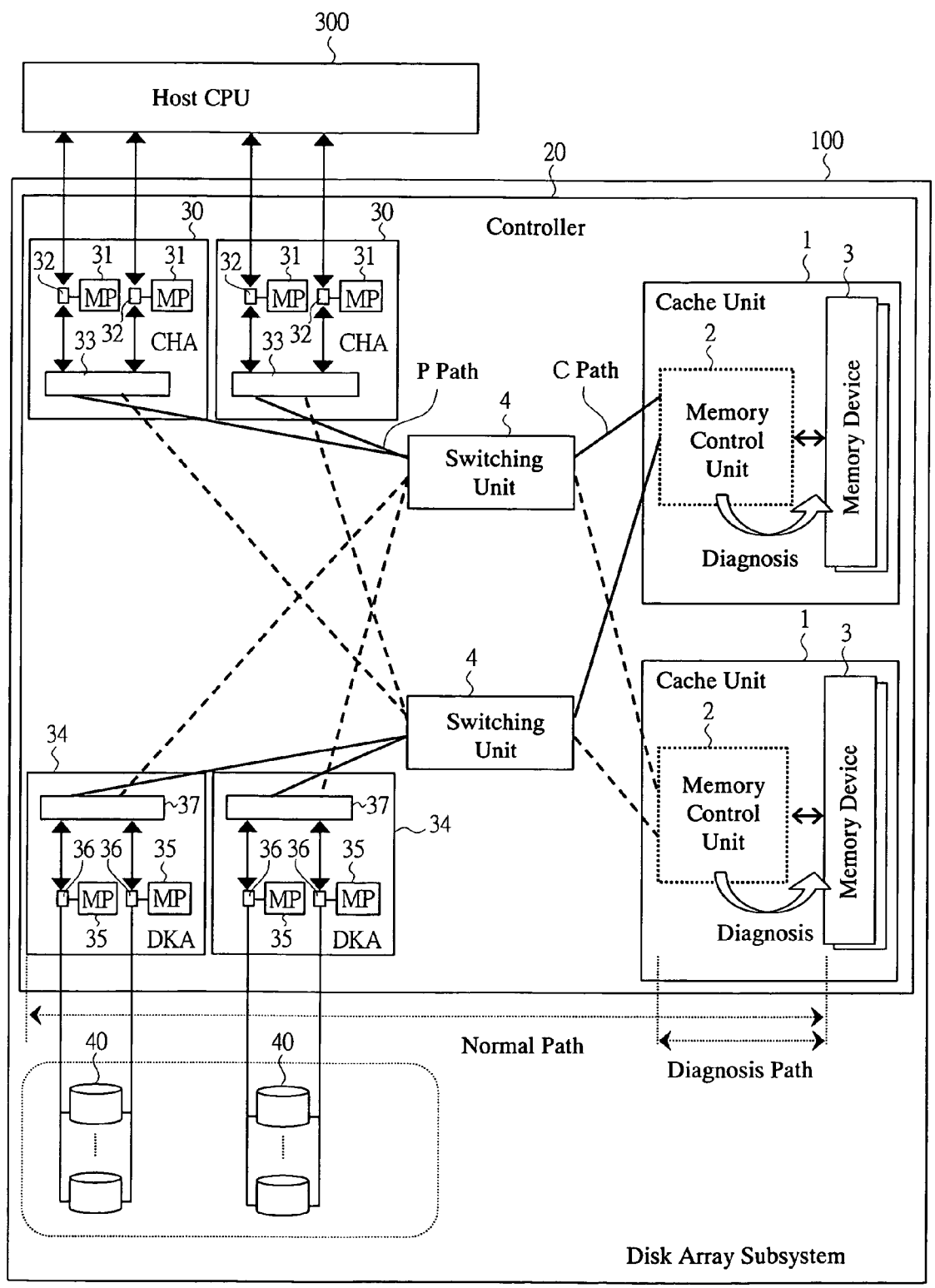
FIG. 2 is a view showing a functional block configuration and a connection configuration with a host unit in a disk array subsystem according to one embodiment of the present invention.

FIG. 2 shows a functional block configuration of the disk array subsystem 100 in the first embodiment of the present invention and a connection configuration with the host unit. The disk array subsystem 100 is configured so that a plurality of disk drives 40 are connected to the controller 20. The controller 20 is configured so that within the chassis of the disk array subsystem 100, the module of each function such as CHA, etc. is connected to the backplane board (not shown) and wired to each other.

The controller 20 has respective processing units such as the host interface unit (also referred to as "CHA") 30, the disk interface unit (also referred to as "DKA") 34, the switching unit (C path switch) 4, and the cache unit 1, etc., wherein the respective processing units are interconnected by the switching unit 4, a physical bus, and a logical path set thereon. The path is used at a time when the processing unit granted use rights of the above path makes an access. The controller 20 can incorporate a plurality of processing units as occasion demands.

A host CPU 300 and the CHAs 30 in the controller 20 are communicably connected through predetermined standards such as a Fiber Channel (FC) interface, etc. Although only one host CPU 300 is shown in FIG. 2, two or more host CPUs 300 can be communicably connected to the controller 20 by the CHAs 30 that corresponding to respective host interfaces. In addition, each group of DKA 34 and disk drive 40 is communicably connected through the predetermined standards such as FC-AL, etc. The switching unit 4 is connected to the CHAs 30 or DKAs 34 through the paths, as well as with the cache unit 1 through the path. By adopting a configuration in which the respective processing units and the paths are multiplexed, it is possible to obtain a configuration in which data path from the host CPU 300 to the disk drive 40 is multiplexed. By adopting such a multiplexed configuration, it is possible to achieve improvement of processing performance and fault tolerance. FIG. 2 illustrates in particularly a case of a duplex configuration.

The CHA 34 executes a communication process with the host CPU 300 according to a host interface protocol and transfers data to/from the cache unit 1. Each CHA 34 has an MP (a processor) 31, a channel interface circuit 32, and a memory access controller 33. In particular, one CHA 34 is configured to have a plurality of MPs 31 therein. One or more CHA 34 is prepared so as to correspond to on a type of the host interface.

The MP 31 operates according to a microprogram and implements each function as a CHA. The channel interface circuit 32 executes a communication process according to the host interface protocol such as a FC protocol. A memory access controller 33 controls a memory access from the CHA 30 to the cache unit 1 through the switching unit 4. That is, the memory access controller 33 makes a memory access including data read/write from/to the cache unit 1 on the path extending from the CHA 30 to the cache unit 1, the memory access being granted use rights through control on the switching unit 4.

The DKA 34 executes a communication process with one or more disk drive 40 according to the disk interface protocol and a data transfer process with the cache unit 1. The DKA 34 has a MP (a processor) 35, a disk interface circuit 36, and a memory access controller 37. In particular, the configuration is such that one DKA 34 has a plurality of MPs 34. The plurality of DKAs 34 with the same function are prepared.

The MP 35 operates according to the microprogram and implements each function as a DKA. The disk interface circuit 36 executes a communication process according to the disk interface protocol. Similarly to the case of the CHA 30, the memory access controller 37 controls a memory access from the DKA 34 to the cache unit 1 through the switching unit 4. That is, the memory access controller 37 makes a memory access including data read/write from/to the cache unit 1 on the path extending from the DKA 34 to the cache unit 1, the memory access being granted use rights through control on the switching unit 4.

The cache unit 1 is a memory unit to be used as a cache memory that retains data in the controller 20 and, in particular, the cache unit 1 is configured as one package board that incorporates the memory control unit 2 and the memory device 3. The CHA 30 or DKA 34 makes the normal memory access to the cache unit 1 through the switching unit 4 and reads/writes data. The memory control unit 2 is a hardware logic that is incorporated as an LSI and controls the memory device 3. The memory device 3 is a memory element that stores data. Various types of DRAMs, SRAMs, flash memories, etc. are available as the memory devices 3. Note that a configuration of the cache unit 1 is not limited to the form of one package board that incorporates the memory control unit 2 and the memory device 3, and may adopt the form in which the memory control unit 2, for example, is disposed/configured at a separate location.

The switching unit 4 connects and switches the path located on a side on which a processor such as the CHA 34 or DKA 35 is provided (referred to as "P path") and the path located on a side on which the cache unit 1 is provided (referred to as "C path"). In FIG. 2, the line to the left of the switching unit 4 corresponds to the P path, and the line to the right of the switching unit 4 corresponds to the C path. For example, through the switching unit 4, the P path, and the C path, the memory access controller 33 in the CHA 30 and the memory control unit 2 in the cache unit 1 are communicatably connected by one logical path. On the paths, various types of pieces of data or information are transferred in the form of a packet. The type of packet includes a command, an address, data (input/output data), and a status, etc. For example, the command is a command such as read/write, etc., and the address is a memory address to be a target of the command. In addition, the data is read data/write data, etc., and the status is error information, etc. Note that, in the controller 30, for example, the P path between the CHA 30 etc. and the switching unit 4 may be set as one path, and the C path between the switching unit 4 and the cache unit 1 may be set as one path, and a path configured by connecting the P path and the C path within an interval from the CHA 30 etc. to the cache unit 1 may also be set as one logical path. Furthermore, inside the cache unit 1, a path from a side of the C path of the memory control unit 2 to the memory device 3 may also be set as one logical path. In addition, in the path having the duplex configuration shown in FIG. 2, the solid line illustrates a path corresponding to the first cache unit 1, and the dotted line illustrates a path corresponding to the second cache unit 1.

Each disk drive 40 is a unit configured so as to contain a storage device such as HDD, etc. and some mechanical components, and is mounted onto the interior of the disk array subsystem 100. The disk drive 40 stores data in a physical storage area, i.e., data on the disk on the bases of communication with the DKA 34. In addition, depending on RAID control by the controller 20, a RAID group corresponding to a RAID type can be configured in the plurality of disk drives 40, and data can be stored by setting logical storage volumes on the RAID group.

As shown in FIG. 2, the first embodiment takes the form in which a diagnosis means is configured so that a diagnosis process can be completed within the cache unit 1, and the memory control unit 2 makes an access to the memory device 3 for a diagnosis thereon by utilizing the bus for a data input/output between the memory control unit 2 and the memory device 3. In addition, in the controller 20, there are a normal access path ("normal path") from the processing unit as the CHA 30 or DKA 34, etc. to the memory device 3 in the cache unit 1 and a diagnosis access path ("diagnosis path"). In the normal access, an access such as data read or data write is made to the memory device 3 from the CHA 30 etc. In the diagnosis access, there is made the access for checking a response to the memory device 3 by the data read, i.e., checking the read data using the ECC.

The cache unit 1 has a logical path between the memory control unit 2 and the memory device 3 therein, and the path is shared by the normal access and the diagnosis access. For this reason, although both paths partly overlap in the cache unit 1, the control for making the diagnosis access is executed during an unoccupied time of the normal access in the memory control unit 2. Therefore, the execution timing or processing time of the diagnosis access does not overlap with the timing or processing time of the normal access.

Thus, the access contention on the path can be avoided, and the processing performance of the normal access is not deteriorated by the diagnosis access. For example, throughput also in the data read process from the CHA 30 to the memory device 3 does not degrade.

<Comparison with Premise Technique>

Figure 11:
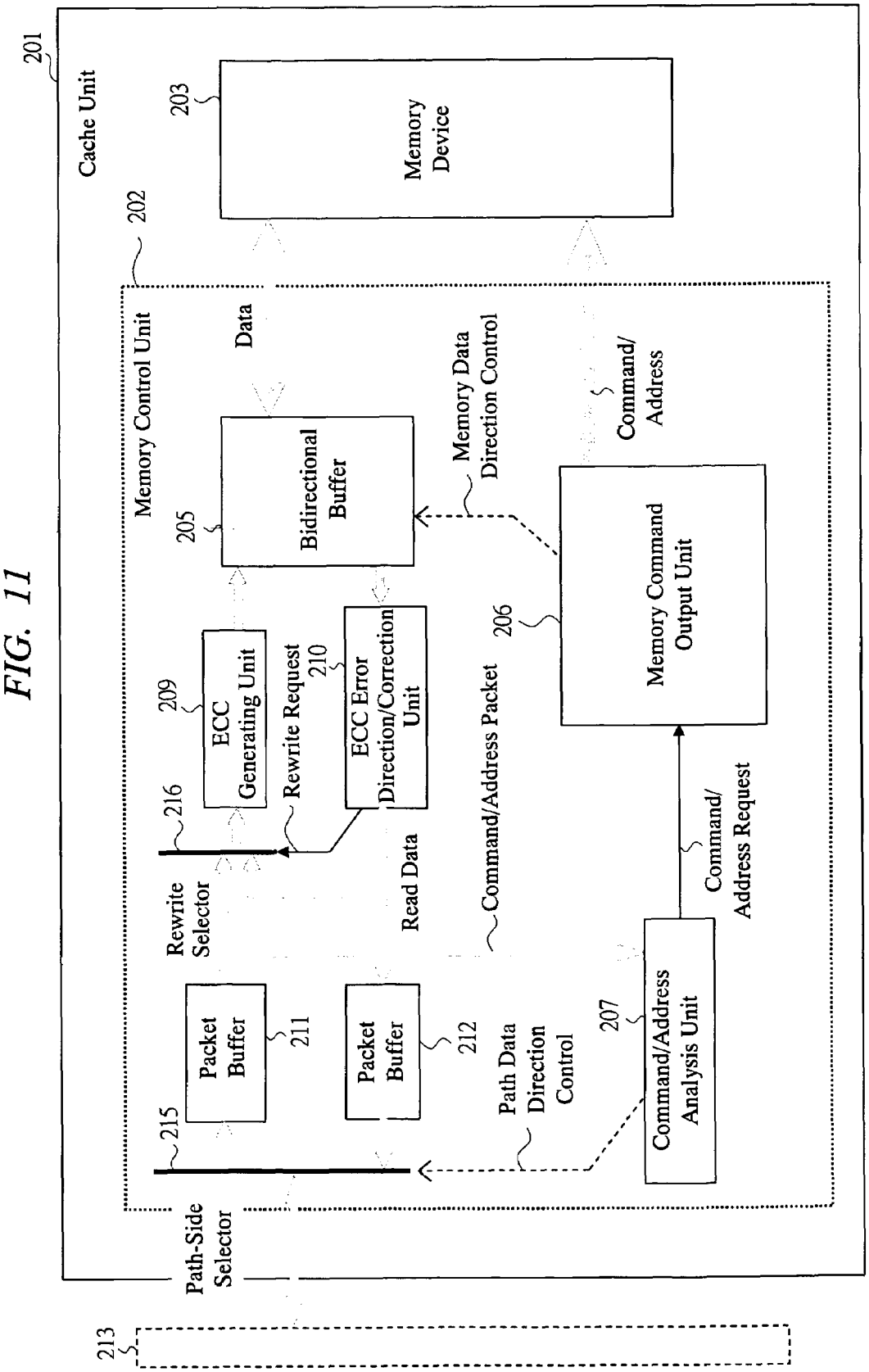
FIG. 11 is a view showing a configuration example of a cache unit in a conventional disk array subsystem examined as a technique premised on the invention by the inventor of the present invention.

FIG. 11 is a view showing a configuration example of a cache unit in a conventional disk array subsystem examined as a technique premised on the invention by the inventor of the present invention. Note that the configuration of the controller in the conventional disk array subsystem is approximately is almost the same as that in FIG. 2. Hereinafter, a configuration of a cache unit 201 to be a premise technique will be described for comparing the configuration of the present invention therewith.

In the cache unit 201, a memory controller 202 is configured to have a bidirectional buffer 205, a memory command output unit 206, a command/address analysis unit 207, an ECC generating unit 209, an ECC error detection/correction unit 210, a READ-directional packet buffer 211, a WRITE-directional packet buffer 212, a path-side selector 215, and a rewrite selector 216, etc. The memory controller 202 is connected to a backplane board 213 for interface path through the path-side selector 215 and the bus. In FIG. 11, the arrows of the solid thick line indicate buses for mainly transferring data series (command, address, data, etc.). The arrows of the dotted line indicate buses for transferring control information series.

The bidirectional buffer 205 is a buffer that can switch an input and an output of data. That is, when data is written to the memory device 203, the bidirectional buffer 205 inputs and buffers the write data from the ECC generating unit 209 and outputs it to the memory device 203. In addition, when data is read from the memory device 203, the bidirectional buffer 205 inputs and buffers the read data from the memory device 203, and outputs it to the ECC error detection/correction unit 210.

The memory command output unit 206 is a circuit that outputs a command and an address to the memory device 203 based on a command/address request from the command/address analysis unit 207. A command outputted by the memory command output unit 206 is each command such as write, read, refresh, etc. In addition, the memory command output unit 206 executes directional control of memory data, which corresponds to a command such as read/write etc. with respect to the bidirectional buffer 205, by outputting a control signal.

The command/address analysis unit 207 is a circuit that extracts a command and an address from a command/address packet received by the packet buffer 211 from the path side located outside the memory controller 202, and outputs the extracted command and address to the memory command output unit 206 as a command/address request. In addition, the command/address analysis unit 207 executes directional control of path data, which corresponds to a command such as read/write, etc. with respect to the path-side selector 215, by outputting the control signal.

The ECC generating unit 209 is a circuit that generates and adds an ECC to data to be a target stored in the memory device 203, i.e., to the write data, and transfers it to the bidirectional buffer 205. The ECC error detection/correction unit 210 is a circuit that makes error detection from the added ECC and verifies (checks) data content of the stored data, i.e., the read data in the memory device 203 transferred from the bidirectional buffer 205 based on the added ECC, wherein it is such a circuit that if any error is detected and correctable, the error is corrected and the data after verification is transferred to the packet buffer 212 and the rewrite selector 216. The normal read data having no error after the verification is transferred to the packet buffer 212. In addition, with respect to the data in which the error is detected and corrected after the verification, the error correction/detection unit 210 sends a rewrite request to the rewrite selector 216 and transfers it to the ECC generating unit 209.

The packet buffer 211 buffers a write-directional packet to the memory device 203. The packet buffer 211 buffers the data from the interface path and the path-side selector 215 and outputs it to the rewrite selector 216. In addition, a command/address packet is outputted from the packet buffer 211 to the command/address analysis unit 207. The packet buffer 212 buffers a read-directional packet from the memory device 203. The packet buffer 212 buffers the data from the ECC error detection/correction unit 210, i.e., the read data and outputs it to the path-side selector 215 and the interface path.

The backplane board 213 for interface path is a board for establishing a connection between each control package 113 constituting the controller 20, and has the interface path constituting partially the path to the cache unit 201. Through the connection by the backplane board 213, the respective processing units including the CHA 30, the DKA 34, the switching unit 4, and cache unit 1 are connected therebetween. Note that the controller 20 may also take the form that respective units are directly connected without interposing the backplane board 213. The data input/output path from the interface path of the backplane board 213 to the memory device 203 becomes a write/read-bidirectional data path.

The path-side selector 215 is a selector that switches write and read direction of data transfer on the path side in accordance with directional control of the path data. The rewrite selector 216 is a selector that switches, to the corrected data and the normal write data, the transfer data at a time when the data corrected by the ECC error detection/correction unit 210 is written to the memory device 203 in accordance with the rewrite request.

In the configuration of the above cache unit 201, a process procedure for a conventional method of making a diagnosis of the data stored in the memory device will be described as follows.

(1) First, in the normal memory access to the memory device 203, the ECC is used to execute the error detection/correction process. When data is transferred between the host CPU 300 and the cache unit 201, the MP 31 incorporated in the CHA 30 transfers the data to/from the cache unit 201 over a specified path. In addition, when data is transferred between the disk drive 40 and the cache unit 201, the MP 35 incorporated in the DKA 34 executes the data transfer to/from the cache unit 201 over a specified path.

(2) When the cache unit 201 receives a command/address packet from a side of the C path, it outputs a command/address request to the memory command output unit 206 based on analysis by the command/address analysis unit 207. In response to the command/address request, the memory command output unit 206 outputs a command/address to the memory device 203. Then, a directional control signal of the memory data is outputted from the memory command output unit 206 to the bidirectional buffer 205, and a directional control signal of the path data is outputted from the command/address analysis unit 207 to the path-side selector 215, whereby the write/read directions of the bidirectional data path are switched.

(3) When a command to the memory device 203 is data read, the ECC error detection/correction unit 210 checks the data outputted from the memory device 203 to the bidirectional buffer 205 in accordance with the above command/address, i.e., the read data by using the ECC.

(4) If any correctable errors are detected through the checking by the ECC error detection/correction unit 210, the ECC error detection/correction unit 210 executes the correct process to the above data, outputs a rewrite request signal to the rewrite selector 216, and makes the corrected data rewritten to the memory device 203. That is, in the rewrite process, the data once read out from the memory device 203 is corrected and written to the memory device 203 again.

(5) Next, regarding the diagnosis of the memory device 203, it is possible to make a regular diagnosis of the data stored in the memory device 203 by means of software through the microprogram in the controller 20 and the processing by the processor. In this case, the MP 31 in the CHA 30 or MP 35 in the DKA 34 transmits, at the timing of the regular diagnosis, a packet containing a command/address for execution of the data read from the memory device 203 incorporated in the cache unit 201, by using an unused path extending up to the cache unit 201, i.e., a path not used for the normal memory access. Then, the cache unit 201 receives the packet, and checks the read data from the memory device 203 corresponding to the command/address in a stat of satisfying the above-described item (4). If the error is detected by the checking, that is, if the read data from a specified address is failure, an error status indicating this is returned as a response to the CHA 30 or DKA 34 from the cache unit 201 by using the same path. Thus, the CHA 30 or DKA 34 can check the data stored in the memory device 203 by using the response of read command.

In the conventional disk array subsystem, although the above-mentioned processing units such as the CHA 30 etc. contained in the controller 20 can make a diagnosis of the memory device 203 by means of software, the memory control unit 202 of the cache unit 201 is not equipped with a diagnosis function of making the diagnosis of the data stored in the memory device 203 for normality. In addition, in such a configuration in which the diagnosis of the memory device 203 is made by means of software, no margin test for fluctuating amplitude of output signals of the memory device 203 is executed.

There is the following problem. That is, if a use request of the same path as the path for the above diagnosis with respect to the normal memory access occurs from a separate processor in the controller 20, performance of the normal access by the regular diagnoses degrades due to contention of the access on the same path.

<Configuration of Cache Unit>

Figure 3:
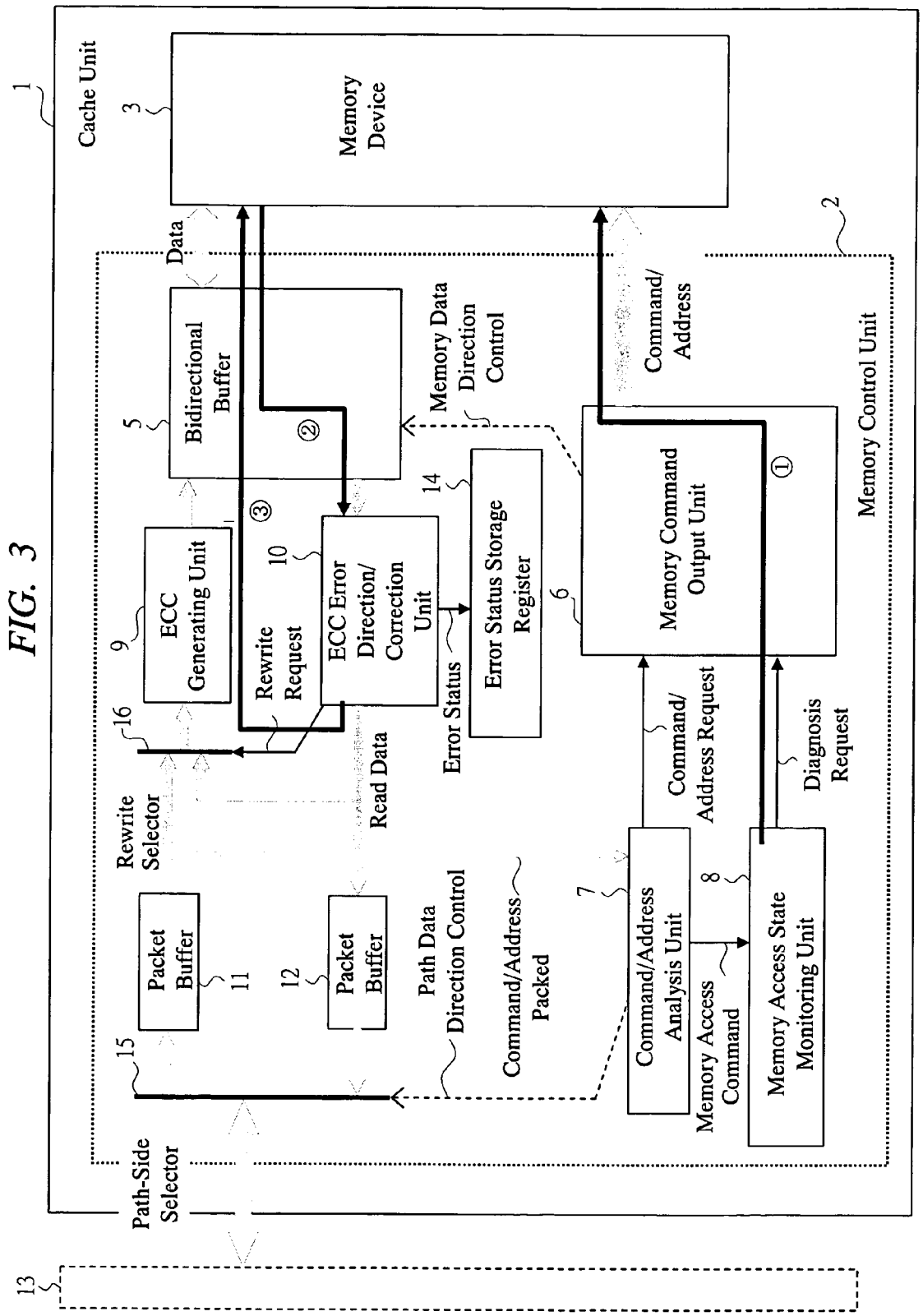
FIG. 3 is a view showing a detailed configuration of a cache unit that a disk array subsystem according to one embodiment of the present invention has.

FIG. 3 shows a detailed configuration of a cache unit 1 contained in the disk array subsystem 100 of the first embodiment. The cache unit 1 is principally configured to have a memory control unit 2 and a memory device 3. The arrows of the thick solid line in FIG. 3 indicate buses for transferring data series (command, address, data, etc.), and the arrows of the dotted line indicate buses for transferring control information series. The arrows with reference numerals indicate routes in the diagnosis access to the memory device 3.

The memory control unit 2 in the cache unit 1 is configured to have a memory access state monitoring unit 8 (hereinafter referred to as "monitoring unit") and an error status storage register 14, in addition to a bidirectional buffer 5, a memory command output unit 6, a command/address analysis unit 7, an ECC generating unit 9, an ECC error detection/correction unit 10, a READ-directional packet buffer 11, a WRITE-directional packet buffer 12, a path-side selector 15, and a rewrite selector 16, etc. The memory control unit 2 is connected to a backplane board 13 for interface path through the path-side selector 15 and the bus. Mainly, the monitoring unit 8, the memory command output unit 6, the ECC error detection/correction unit 10, and the error status storage register 14 configure a diagnosis function. Each element such as the bidirectional buffer 5, the memory command output unit 6, the command/address analysis unit 7, the ECC generating unit 9, the ECC error detection/correction unit 10, packet the buffers 11 and 12, the path-side selector 15, the rewrite selector 16 has the same functions as those of the respective elements of the conventional technique as shown in FIG. 11. Functions other than the conventional functions will be described as follows.

The memory command output unit 6 is a circuit capable of outputting a command and an address for diagnosis and further a request etc. related to the diagnosis of the memory device 3 in accordance with the diagnosis request from the monitoring unit 8.

The command/address analysis unit 7 extracts a command and an address from a command/address packet received at the packet buffer 11 from a side of the path located outside the memory control unit 2, and then outputs, as a command/address request, not only the extracted command and address to the memory command output unit 6, but also outputs a memory access command to the monitoring unit 8. The memory access command outputted from the command/address analysis unit 7 is a command such as read/write etc. related to the normal memory access to the memory device 3 in the cache unit 1 or is information related thereto and generated by the command/address analysis unit 7.

The ECC error correction/detection unit 10 is a circuit that, when the diagnosis is made, uses the ECC to execute the error detection of the data transferred from the bidirectional buffer 5 and stored in the memory device 3, i.e., of the read data, wherein if any error is detected and is correctable, the error is corrected and the data after the checking is transferred to the packet buffer 12 and the rewrite selector 16. The normal read data having no error after the checking is transferred to the packet buffer 12. In addition, the ECC generating unit 9 receives the corrected data from the ECC error detection/correction unit 10 during the diagnosis, and outputs it to the memory device 3. The ECC error detection/correction unit 10 stores log information of a process in the error status storage register 14.

The rewrite selector 16 is a selector that switches, to the corrected data and the normal write data, the transferred data at a time when the data corrected by the ECC error detection/correction unit 10 is written to the memory device 3 in accordance with the rewrite request during the diagnosis.

A data input/output path extending between the interface path of the backplane board 13 and the memory device 3 is a bidirectional data path for write/data. The above path is commonly used by the normal memory access in the controller 20 and the diagnosis memory access in the first embodiment.

The monitoring unit 8 is a circuit that monitors a status of a memory access to the memory device 3 based on the memory access command received from the command/address analysis unit 7. In addition, the monitoring unit 8 is a circuit that, based on recognition and/or determination of a memory access state, determines timing of making a diagnosis access to the memory device 3 and outputs a diagnosis request to the memory command output unit 6 with the execution timing of the above diagnosis access. The monitoring unit 8 determines and recognizes an unoccupied time in the normal memory access by monitoring the status of the memory access to the memory device 3. It also checks, as a diagnosis of the memory device 3, normality of the memory data, that is, checks whether any data failure has occurred. In the above checking, a command/address of the data read to the memory device 3 is issued from the memory command output unit 6 of the memory control unit 2 to the memory device 3, and the read data for responding thereto is checked using the ECC by the memory control unit 2.

The error status storage register 14 is a register for storing log information of a process executed by the ECC error detection/correction unit 10. The ECC error detection/correction unit 10 stores, in the error status storage register 14, an error status obtained at a time when any error is detected by the checking of the read data from the memory device 3. Some diagnosis result can be understood by reading the log information stored in the error status storage register 14.

The memory device 3 is connected to the cache unit 1, for example, in the form of a DIMM in an increasable/decreasable manner. The memory device 3 has a number of memory addresses. When the data is written to the memory device 3, the memory address is specified together with the command and the data to which the ECC is added through a process executed by the memory control unit 2 is stored in a memory area of the specified memory address. In addition, when the data is read to the memory device 3, the memory address is specified together with the command and the data to which the ECC is added is read from the memory area of the specified memory address. When the diagnosis is made, the diagnoses of the respective memory addresses in the memory device 3 are executed. Since the specification of the memory address is changed from the memory control unit 2 and the diagnosis access is executed, a full or partial surface of the memory device 3 can be executed for diagnosis.

<Diagnosis Process in Cache Unit>

During the normal operation of the disk array subsystem 100 in the configuration of the cache unit 1, a description will be later made of a processing procedure for automatically making diagnoses of the stored data in the memory device 3. First, in the normal memory access to the memory device 3 in the controller 20, the memory control unit 2 uses the ECC to execute the error detection/correction process. When the data is transferred between the host CPU 300 and the cache unit 1, the MP 31 incorporated in the CHA 30 executes the data transfer between the MP 31 and the cache unit 1 over the specified path. When the data is also transferred between the disk drive 40 and the cache unit 1, the MP 35 incorporated in the DKA 34 executes the data transfer between the cache unit 1 and the DKA 34 over the specified path. A normal access in this case is made similarly to the process procedure as described in items (1) to (4) in the configuration of the conventional cache unit 201.

Next, regarding the diagnosis access of the memory device 3, the diagnosis of the data stored in the memory device 3 is automatically executed in the cache unit 1 without requiring the microprogram in the controller 20 and the processing executed by the processor. Based on the determination of the monitoring unit 8, the memory control unit 2 of the cache unit 1 makes a diagnosis access to the memory device 3 with the periodic timing, for example.

(1) First, when the cache unit 1 receives a command/address packet from a side of the C path, a command/address request based on analysis by the command/address analysis unit 7 is outputted to the memory command output unit 6 and concurrently a memory access command to the monitoring unit 8 is outputted.

(2) The monitoring unit 8 receives the memory access command from the command/address analysis unit 7, and determines and recognizes a memory access state of the memory device 3. As a result, when the normal access has an unoccupied time, i.e., a non-memory access time and such a time does not contend with the normal access, the monitoring unit 8 issues a diagnosis request to the memory command output unit 6. In response to the issued diagnosis request, there is made the access for checking the stored data in the memory device 3 by using a logical path in the cache unit 1.

(3) Based on the diagnosis request from the monitoring unit 8, the memory command output unit 6 outputs, to the memory device 3, a command/address for executing the data read from the memory device 3. In the memory device 3, the stored data is read from a memory area of the specified address on the basis of the command/address from the memory output unit 6, and is outputted to the bidirectional buffer 5 through the data input/output bus with the memory control unit 2.

(4) The memory control unit 2 checks the read data outputted from the memory device 3 to the bidirectional buffer 5 in accordance with the command/address by using the ECC at the ECC error detection/correction unit 10. If checking at the ECC error detection/correction unit 10 detects any error in the read data, the error status indicating a checked result is stored in the storage register 14 for error status. Furthermore, if the error is detected by the checking at the ECC error detection/correction unit 10 and is correctable, the above data is corrected and the corrected data is outputted and further a rewrite request signal is outputted to the rewrite selector 16 and is rewritten to the memory device 3 through the ECC generating unit 9.

Thus, by making the diagnosis access while the normal memory access is not executed, the content of the data stored in the memory device 3 can be checked. This checking allows any defects in the memory data to be detected in advance, and further if the detected defects are correctable, the data can be recovered in advance by correcting the defects.

The unoccupied time in the normal memory access is determined by monitoring of the memory access state and determining of the timing of executing the diagnosis in the monitoring unit 8. In the process of the monitoring unit 8, for example, based on reception of the normal memory access command to the memory device 3, the diagnosis request is issued under the condition that the monitoring unit 8 is in a non-memory access state in view of the process of read/write etc. to the memory device 3 and the processing time. In addition, based on calculation of occurrence frequency of the normal access to the memory device 3 or a ration of the memory access time, etc., the monitoring unit 8 may issue the diagnosis request with the predicted timing that a certain degree of unoccupied time will occur from the statistical viewpoint. Alternatively, it may issue the diagnosis request at a time of elapse of a certain predetermined non-memory access time.

In the first embodiment, in accordance with monitoring of the memory access state, the monitoring unit 8 makes the diagnosis access as a first diagnosis process through the periodic timing having a certain period under the condition that the monitoring unit 8 is in the non-memory access state. That is, a diagnosis access is executed after a certain period of time has elapsed from execution of the previous diagnosis. In addition, a method other than the above-mentioned method may be executed as follows. Namely, as a second diagnosis process, the monitoring unit 8 determines, by a simple calculation, a ratio of a normal memory access time to a non-memory access time during a certain period of time from the present to the past, or a ration of a non-memory access time to the total time, or a ratio of frequencies rather than time, or the like in accordance with monitoring of the memory access state. If a calculated value is equal to or more than a predetermined value, the diagnosis access is executed under the condition that the monitoring unit 8 is in a non-memory access state. The monitoring unit 8 statistically determines the unoccupied time in the normal memory access or a period of time during which frequency of the normal memory access is low, in accordance wit the memory access state in the past.

<Process by Monitoring Unit>

Figure 4:
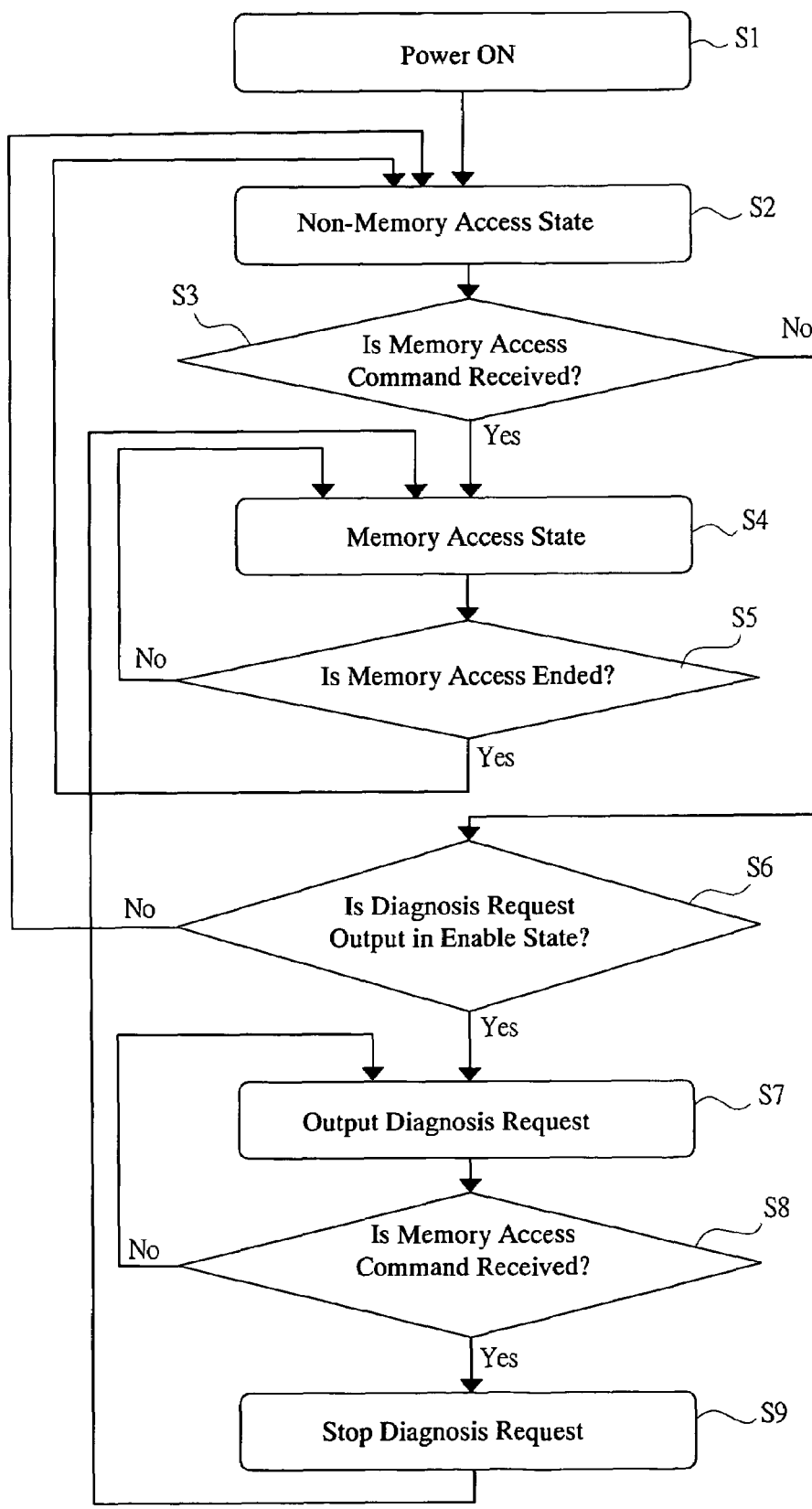
FIG. 4 is a flow chart showing monitoring of a memory access state by a memory access state monitoring unit and a processing of a main operation related to determination of diagnosis timing, in a cache unit in a disk array subsystem according to one embodiment of the present invention.
Figure 5:
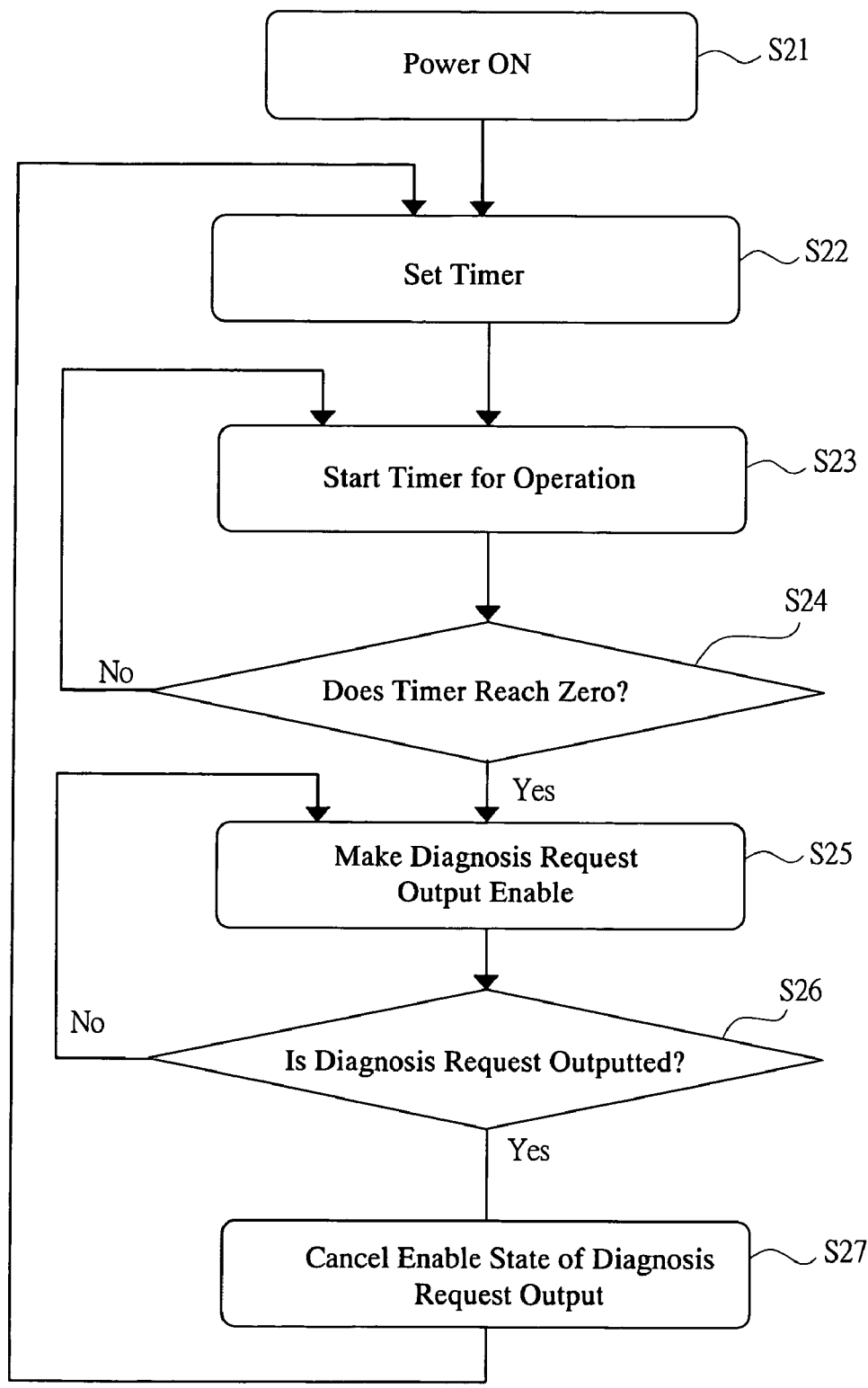
FIG. 5 is a flow chart illustrating a first diagnosis process by a memory access state monitoring unit, in a cache unit in a disk array subsystem according to one embodiment of the present invention.
Figure 6:
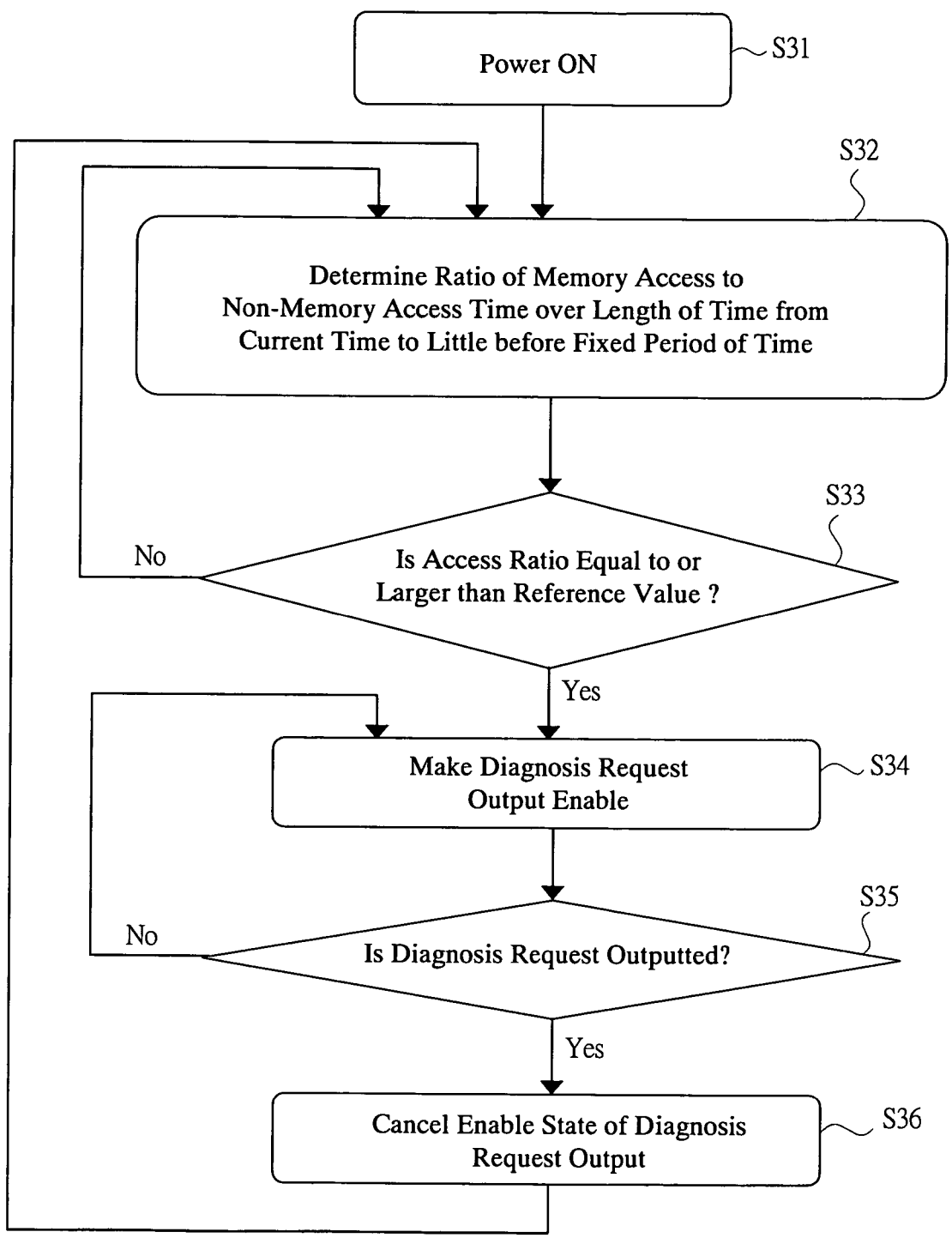
FIG. 6 is a flow chart illustrating a second diagnosis process by a memory access state monitoring unit, in a cache unit of a disk array subsystem according to one embodiment of the present invention.

FIGS. 4 to 6 are particularly a flow chart showing a process for monitoring the memory access state and determining the timing of making the diagnosis in the monitoring unit 8 of the cache unit 1. FIG. 4 shows a process for a main operation in the monitoring unit 8. FIGS. 5 and 6 show a first diagnosis process and a second diagnosis process, respectively, related to the determination of the timing of executing the diagnosis associated with the main operation in the monitoring unit 8. Respective processes shown in FIGS. 5 and 6 particularly relate to an output (ON/OFF) of a diagnosis request output-enable signal in the monitoring unit 8. The diagnosis request output-enable signal (hereafter referred to as "enable signal") is a signal for enabling/disabling the output of the diagnosis request from the monitoring unit 8 to the memory command output unit 6.

The monitoring unit 8 recognizes the memory access state to the memory device 3 based on a memory access command inputted from the command/address analysis unit 7. Then, in the non-memory access state, a diagnosis request is outputted to the memory command output unit 6 under the condition that the diagnosis request is in an enable state, whereby the diagnosis access is executed to the memory device 3. Hereinafter, the "non-memory access state" means a state where the memory control unit 2 has not received a normal memory access command such as read/write, etc. or a process corresponding thereto has not been executed. On the one hand, the "memory access state" means a state where the memory control unit 2 has received a normal memory access command or a process corresponding thereto has been executed.

In FIG. 4, after the power of the controller 20 and the cache unit 1 is turned ON (step S1), the cache unit 1 first becomes in a non-memory access state (S2). When the memory control unit 2 has received a memory access command from the switching unit 4 or a side of the C path (S3—Yes), it is recognized that the cache unit 1 is in a memory access state (S4), through the process by the command/address analysis unit 7 and the determination by the monitoring unit 8. In the memory access state (S4), it is determined whether the process corresponding to the memory access has ended (S5). If the process has not ended (S5—No), the memory access state (S4) is continued. If the process has ended (S5—Yes), the cache unit 1 returns to the non-memory access state (S2).

In the step S3, when the memory control unit 2 has not received a memory access command from the switching unit 4 and a side of the C path (S3—No), it is determined whether an output of the diagnosis request in the monitoring unit 8 is in an enable state. That is, by turning ON/OFF the enable signal (S6), if the request output is not in an enable state (S6—No), it returns to a non-memory access state (S2) and no diagnosis is executed. If the request output is in an enable state (S6—Yes), the monitoring unit 8 outputs a diagnosis request to the memory command output unit 6 (S7). When the diagnosis request is outputted, the corresponding diagnosis process is executed.

Then, when no memory access command is received (S8—No), the diagnosis request is outputted (S7) and a condition for executing a diagnosis process is continued. A processing mode, at which a continuous diagnosis processing is executed in the non-memory access state, is possible. Or, such a processing mode as to once terminate after the diagnosis process is executed in a certain period of time is also possible. When the memory access command is received (S8—Yes), the diagnosis request is stopped (S9) in order to give priority to the normal memory access and the request output returns to the memory access state (S4).

Next, in FIG. 5, the monitoring unit 8 outputs enable signals at a fixed period, as the first diagnosis process. Thereby, the diagnosis access becomes in an executable state per fixed period, that is, after a period of time has elapsed since the previous diagnosis access. Alternatively, the period of output of the enable signals may fluctuate depending on settings in the memory control unit 2.

After the power of the controller 20 and the cache unit 1 is turned ON (S21), the monitoring unit 8 first sets, to a predetermined value, a timer for determining the timing of turning the enable signal ON by counting (S22), and makes an operation of the timer start (S23). Then, the monitoring unit 8 waits until the value of the timer reaches zero by the counting (S24). When the timer value reaches zero (S24—Yes), the monitoring unit 8 makes the output of the diagnosis request set in an enable state by turning the enable signal ON (S25). The enable state is maintained until the monitoring unit 8 outputs the diagnosis request (S26—No) by changing to a non-memory access state. If the monitoring unit 8 outputs the diagnosis request (S26—Yes), the enable state of the output of the diagnosis request is cancelled, i.e., the request output is set to a disable state (S27) by turning the enable signal OFF. Then, a state in the S27 returns to the S22, and the timer is reset and the counting by the timer is restarted.

Next, in FIG. 6, when the ratio of the non-memory access time to the memory access time is equal to or larger than a reference value, the monitoring unit 8 outputs the enable signals, as the second diagnosis process. Therefore, by guessing, from statistical judgment at a certain point, that the monitoring unit 8 becomes in a non-memory access state immediately after the enable signals are outputted, the diagnosis access becomes in an executable state. This is a process that is replaced with the first diagnosis process. The reference value etc. for the judgment may fluctuate depending on settings of the memory control unit 2.

After the power of the controller 20 and the cache unit 1 are turned ON (S31), a ratio of the non-memory access time to the memory access time (hereafter referred to as "access ratio") over a length of time from the current time to a little before certain period of time in the past is determined by a simple calculation (S32). For example, since the monitoring unit 8 memorizes a received state of the past memory access command, the access ratio can be calculated. The monitoring unit 8 determines whether the access ratio then is equal to or more than a predetermined reference value (S33). If the ratio is not equal to or more than the reference value (S33—No), the monitoring unit 8 sets the output of the diagnosis request to a disable state without changing to the enable state and is returned to the S32. If the ratio is equal to or more than the reference value (S33—Yes), the monitoring unit 8 sets the output of the diagnosis request to the enable state (S34) by turning the enable signal ON. Subsequently, the enable state is maintained until it becomes in the non-memory access state and the diagnosis request is outputted (S35—No). When the monitoring unit 8 outputs the diagnosis request (S35—Yes), it cancels the enable state of the output of the diagnosis request by turning the enable signal OFF (S36). Then, the stat of the monitoring unit 8 is returned to the S32 and the determination is made again by the access ratio.

Figure 7A:
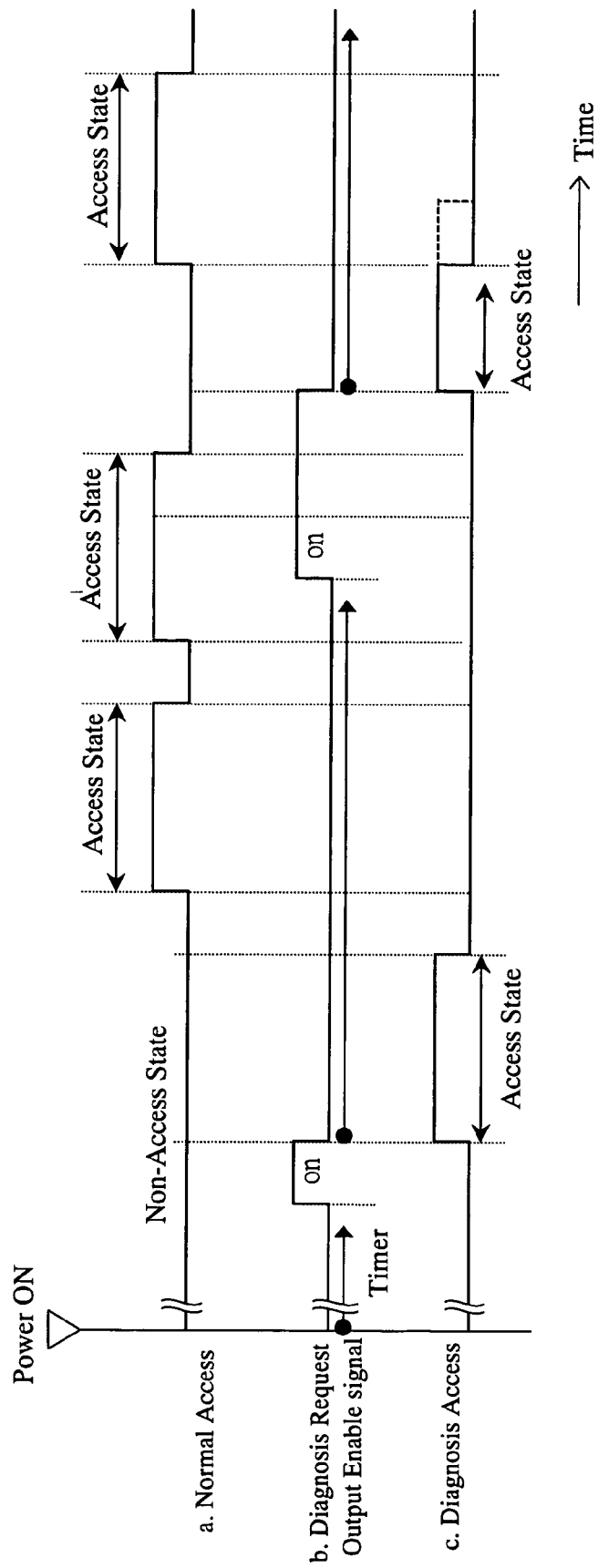
FIG. 7A is a time chart of execution of a normal access corresponding to a processing illustrated in FIG. 4 to FIG. 6, in a cache unit in a disk array subsystem according to one embodiment of the present invention.

Next, FIGS. 7A and 7B are time charts of execution examples of a normal access and a diagnosis access, which correspond to the processings shown in FIGS. 4 to 6. FIG. 7A corresponds to the first diagnosis process in which the enable signals are outputted at a certain period, and FIG. 7B corresponds to the second diagnosis process in which the enable signals are outputted depending on the access ratio.

In FIG. 7A, a "normal access" of a signal "a" shows a state of a normal memory access, as a memory access state to the memory device 3, i.e., as an access state/non-access state. A signal "b" indicates ON/OFF of the enable signal. A "diagnosis access" of a signal "c" shows a state of a diagnosis memory access, as an access state/non-access state. Hereinafter, the examples shown in FIG. 7 will be described in order of time. The access state corresponds to-the access-time and the non-access state corresponds to the non-access time. Note that although the processing times of the normal access (signal "a") and the diagnosis access (signal "c") are illustrated for simplicity to have the same length, they may be really increased and/or decreased depending on contents of the process.

After the power of the controller 20 and the cache unit 1 is turned ON, the monitoring unit 8 of the memory control unit 2 sets the timer to the value corresponding to the fixed period, and the counting starts. First, the signals are in non-memory access states. When the timer value is zero, the enable signal is switched from OFF to ON (signal "b"). Then, since the signal of the normal access is in a non-access state (signal "a"), the monitoring unit 8 issues a diagnosis request and the diagnosis access is started for execution (signal "c"). With this, the enable signal is switched from ON to OFF and the counting starts after the timer is reset (signal "b"). The diagnosis process corresponding to the diagnosis access is completed within a predetermined time (signal "c"). Then, the first normal access occurs and the normal data input/output process is completed within a determined time (signal "a").

Thereafter, there is illustrated the case where the second normal access occurs (signal "a"), the timer is zero in the middle of a access time in this access state, and the enable signal is switched from OFF to ON (signal "b"). In this case, since the normal access has not yet been completed (signal "a"), the diagnosis access is not started until the normal access is completed. After the normal access process is completed (signal "a"), the diagnosis access is started for execution (signal "c"). With this, the enable signal is changed from ON to OFF, the timer is also reset, and the counting is started (signal "b").

Then, in the middle of the diagnosis process by the diagnosis access (signal "c"), the normal access occurs (signal "a"). At this time, since priority is given to a process for the normal access, the diagnosis process is stopped in the middle (signal "c") and the process for the normal access is executed (signal "a").

In FIG. 7B, the respective signals "a", "b", and "c" show a state of the normal memory access, ON/OFF of the enable signals, and a state of the diagnosis memory access, respectively, similarly to FIG. 7A. Note that the signals "b" and "c" show states at the middle of processes, respectively.

Since the plurality of normal accesses occur in the signal "a", the access state as shown in the Figure, i.e., the access time is distributed. The monitoring unit 8 calculates a ratio of the non-access time to the access time (access ratio) at a time of occurrence of the normal access over a length of time from the current time to a certain period of time in the past. When a calculated value of the access ratio is equal to or larger than a predetermined reference value, the enable signal is changed from OFF to ON. Then, similarly to the process as shown in FIG. 7A, the diagnosis access is executed in the enable state when the normal access is in the non-access state. In addition, if the normal access occurs during the diagnosis access, priority is given to the normal access similarly to the process as shown in FIG. 7A.

<Effects and Variants>

In the first embodiment, the diagnosis means is implemented as hardware in the memory controller 2, and an automatic diagnosis process to be completed within the cache unit 1 is possible. There is no special need of giving the cache unit 1 an instruction to make a diagnosis by the processor within the controller 20. Since the diagnosis memory access is controlled by the monitoring unit 8 so as to be executed during the unoccupied time of normal memory access, the accesses are not contended on the path in the cache unit 1, whereby also use rights of the path between the CHA 30 etc. and the cache unit 1 are not affected thereby. Hence, a diagnosis can be made without degrading performance of data transfer in the normal operation of the controller 20, and thus reliability of data in the memory device 3 can be enhanced. In particular, at a time of occurrence of any data error in the memory device 3, detection can be made by the diagnosis before the memory device 3 is used in the normal operation and further if any data failure is detected and is correctable, a rewrite process is executed. Therefore, repair of the memory data is possible in advance. By such a diagnosis function, reliability of data written to the memory device 3 of the cache unit 1 in the controller 20 is improved when the data is read.

Note that, in the present embodiment, although the configuration in which the normality of the memory data is checked by using the ECC is adopted, a configuration in which the checking is done by some means other than the ECC may be adopted. In addition, the above-mentioned configuration is not limited to the cache unit 1, and may be similarly applied to other memory contained in the controller 20, e.g., to the shared memory unit in which control information is stored.

In addition to checking of the memory data, if the memory device 3 contains an error detection circuit therein, it may also be acceptable to use this circuit for checking a command/address to be inputted from the memory command output unit 6B to the memory device 3 for normality. A checking result is to be transmitted to the memory control unit 2 and an error, if any, is to be reported. For example, the error detection circuit in the memory device 3 detects the error and sends an error state to and stores in the error status storage register 14. The error detection circuit provided in the memory device 3 is a conventional technique.

As a modified example, through a process of the monitoring unit 8 etc., the control may be executed to increase and/or decrease frequency of execution of the diagnosis access or processing time. For example, in accordance with a state of the memory access or setting, the monitoring unit 8 increases and/or decreases frequency of the diagnosis access automatically or depending on an instruction from the outside of the cache unit 1. In addition, the cache unit 1 may control not only the diagnosis access but also the normal access in connection with the diagnosis access. For example, the cache unit 1 executes such control that the normal access associated with the diagnosis access is increased and/or decreased within a range of slightly degraded performance. For example, the cache unit 1 executes control as to suppress the normal access, and shift the execution timing to stand by therefor, etc. In addition, for example, the cache unit 1 executes control in which not only the normal access to the specific memory device 3 is suppressed or kept waiting for a certain period of time, but also the diagnosis is made intensively by increasing the diagnosis access.

In addition, the embodiment may have a configuration in which not only the diagnosis of the memory device 3 is automatically executed, but also the diagnosis access is executed similarly depending on an diagnosis instruction of the memory control unit 2 or the monitoring unit 8, etc. Also, the embodiment may have a configuration in which frequency or type of the diagnosis is set in a register etc. contained in the monitoring unit 8 etc. in the memory unit 1, whereby the diagnosis operation is executed according to the settings.

Second Embodiment

Figure 8:
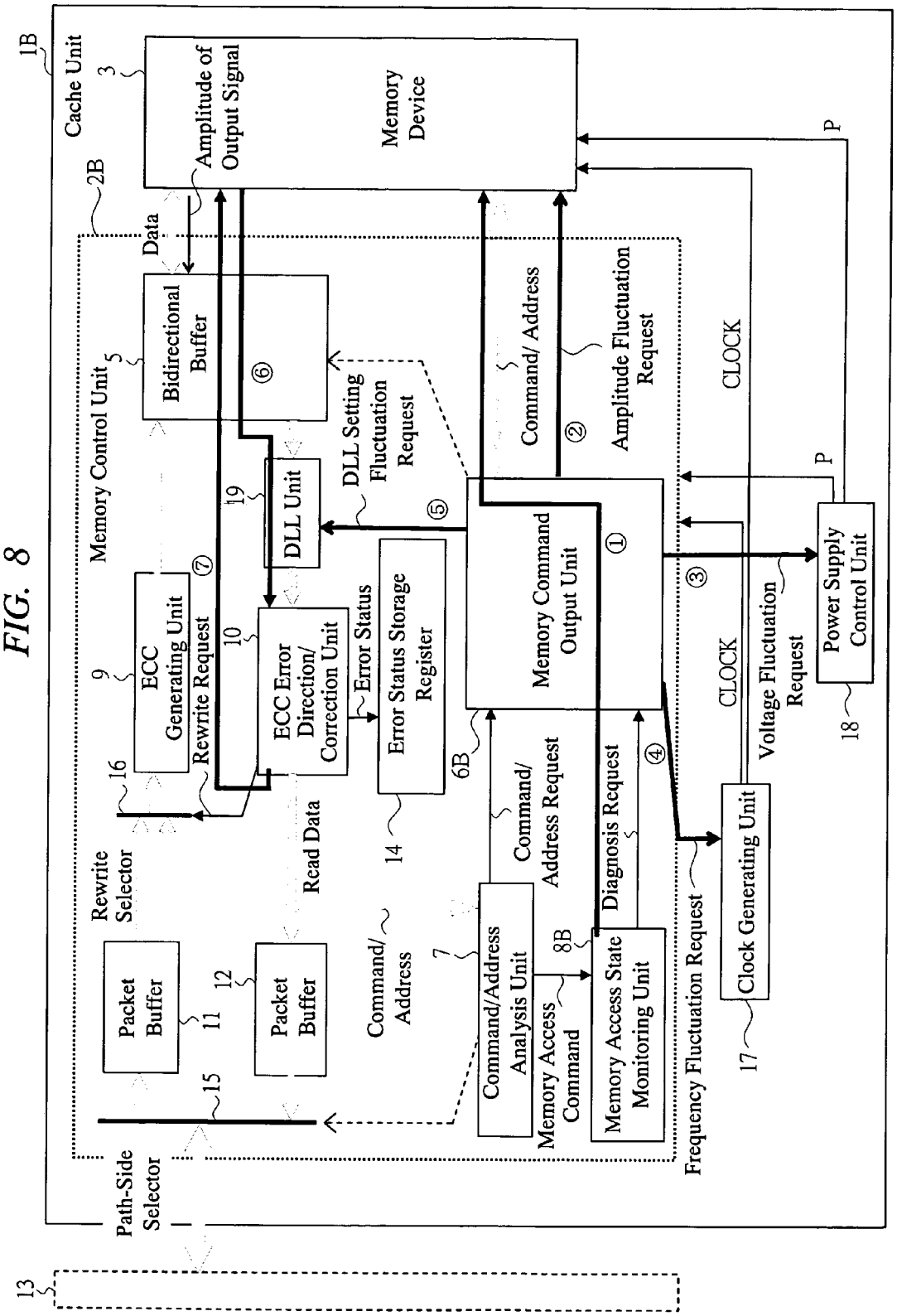
FIG. 8 is a view showing a detailed configuration of a cache unit that a disk array subsystem according to another embodiment of the present invention has.

Next, a disk array subsystem 100 according to a second embodiment of the present invention will be described. FIG. 8 is a view showing a detailed configuration of a cache unit 1B in the disk array subsystem 100 according to a second embodiment. The basic configuration of the disk array subsystem 100 of the second embodiment is the same as that of the first embodiment, and differs from that of the first embodiment in an internal configuration and a process of the cache unit 1B.

In addition to a configuration in which the diagnosis as shown in the first embodiment is made, the second embodiment has a configuration in which, in the cache unit 1B having the memory device 3 in the controller 20, various characteristics related to the data input/output of the memory device 3 is fluctuated during the normal operation and the margin test is conducted. In order to make the diagnosis of the memory device 3, the memory control unit 2B makes the access to the memory device 3 for the margin test while no normal memory access is executed. In the access for diagnosis, the memory control unit 2B fluctuates various characteristics within a range of operation specification, carries out the margin test for checking the response by using the ECC similarly to the first embodiment, and earlier detects some data error due to instability of the characteristics.

In the margin test, for the memory device 3 or memory control unit 2B, the memory control unit 2B executes such control as to fluctuate the various characteristics related to the input/output signals as data signals and strobe signals in the data input/output between the memory control unit 2B and the memory device 3, in other words, conditions or values amplitudes of output signals, voltage of supply power source, clock frequency, DLL settings, within the range of operation specification. A response from this control is used to check whether the subsystem can operate normally without occurrence of the error due to the fluctuations.

In FIG. 8, the cash unit 1B is mainly configured to have the memory control unit 2B and the memory device 3. In the cache unit 1B, the memory control unit 2B is configured to have a bidirectional buffer 5, a memory command output unit 6B, a command/address analysis unit 7, an ECC generating unit 9, an ECC error detection/correction unit 10, a READ-directional packet buffer 11, a WRITE-directional packet buffer 12, a path-side selector 15, a rewrite selector 16, a memory access state monitoring unit 8B, an error status storage register 14, and a DLL unit 19. In addition, the cache unit 1B has the clock generating unit 17 and the power supply control unit 18 as a portion related to the margin test. The diagnosis function in the second embodiment is mainly configured by respective functions of a monitoring unit 8, a memory command output unit 6B, the ECC error detection/correction unit 10, the error status storage register 14, the DLL unit 19, the clock generating unit 17, and the power supply control unit 18. Respective elements such as the bidirectional buffer 5 have the same function as that in the elements in the first embodiment. Hereinafter, functions other than those in the first embodiment will be described.

The memory command output unit 6B is a circuit that, based on a diagnosis request from the monitoring unit 8, comprises the function of outputting a command and a diagnosis address to the memory device 3, and a request for control related to various types of margin tests. The memory command unit 6B can output an amplitude fluctuation request to the memory device 3 based on the diagnosis request. It can also output a frequency fluctuation request to the clock generating unit 17. In addition, it can output a voltage fluctuation request to the power supply control unit 18. It can also output a DLL setting fluctuation request to the DLL unit 19. Each fluctuation request can be outputted independently.

An ECC error detection/correction unit 10 is a circuit that verifies data by executing the error detection with the ECC on the data stored in the memory device 3 and is transferred from the bidirectional buffer 5 through the DLL unit 19, i.e., the read data when a diagnosis is made. It detects a data error resulting fluctuation control for the margin tests and stores an error status indicating the above point in the error status storage register 14.

Based on the memory access command received from the command/address analysis unit 7, the monitoring unit 8B is a circuit that monitors a memory access state to the memory device 3. In addition, based on knowledge of or determination on the memory access state, the monitoring unit 8 determines the timing of executing the diagnosis access related to the margin test to the memory device 3, and outputs the diagnosis request to the memory command output unit 6 with the timing of executing the diagnosis access. The diagnosis request corresponds to the type of diagnosis to be made. The monitoring unit 8 determines the unoccupied time during the normal memory access and determines the timing of executing the diagnosis similarly to the first embodiment.

The clock generating unit 17 generates clocks to be supplied to the memory control unit 2B and the memory device 3. For this diagnosis function, the clock generating unit 17 is provided with a function of fluctuating the clock frequency ("CLOCK" in FIG. 8) supplied to the respective units, in accordance with a frequency fluctuation request from the memory command output unit 6.

The power supply control unit 18 generates the power supply to be supplied to the memory control unit 2B and the memory device 3. For this diagnosis function, the power supply control unit 18 is provided with a function of fluctuating a voltage level ("P" in FIG. 8) of the power supply to be supplied to the respective units in accordance with the voltage fluctuation request from the memory command output unit 6B.

The DLL unit 19 assumes a function of delaying data/signals to be supplied from the memory device 3 to the memory control unit 2B for a fixed period of time. The DLL unit 19 synchronizes respective signals from the memory device 3 by a delay element. The DLL unit 19 is mainly used in controlling a DDR-SDRAM (Double Data Rate-Synchronous DRAM) as a memory device 3. In addition, the DLL unit 19 is configured to have therein a setup register for determining a delay amount. The DLL unit 19 fluctuates the setting of the delay amount in accordance with a DLL setting fluctuation request from the memory command output unit 6B.

The memory device 3 outputs such signals as data signals, strobe signals, etc. in the bus for data input/output (hereafter referred to as "data bus") between the memory control unit 2B and the bidirectional buffer 5. In this data bus, amplitude of the output signals is fluctuated according to an amplitude fluctuation request from the memory command output unit 6B. Similarly, in the data bus between the memory control unit 2 and the memory device 3, respective characteristics are fluctuated in accordance with fluctuation requests such as voltage of power supply, clock frequency, and DLL settings.

In addition, in the processing for fluctuation of the clock frequency from the clock generating unit 17 or fluctuation of the voltage level from the power supply control unit 18, the memory device 3 and the memory control unit 2 that serve as a transmitting side and a receiving side of the data input and output can carry out the margin test, as necessary, which fluctuates one side or both sides.

In the configuration of the cache unit 1B, a process procedure in the process for making an automatic diagnosis, including a margin test, of data stored in the memory device 3 will be described while the disk array subsystem 100 is operating normally. First, in the normal memory access to the memory device 3 in the controller 20, the memory control unit 2B executes an error detection/correction process using the ECC similarly to the first embodiment. For the diagnosis access, the cache unit 1B fluctuates respective characteristics as a margin test in the cache unit 1B and a diagnosis process, in which the data stored in the memory device 3 is checked for normality by using the ECC, is automatically executed. Based on determination of the monitoring unit 8B, the memory control unit 2B executes the diagnosis access to the memory device 3 with the regular timing, for example.

(1) First, when the cache unit 1B receives a command/address packet from a side of the C path, it outputs not only a command/address request to the memory command output unit 6 based on analysis at the command/address analysis unit 7, but also a memory access command to the monitoring unit 8B.

(2) After receipt of the memory access command from the command/address analysis unit 7, the monitoring unit 8B determines and recognizes a memory access state for the memory device 3. Consequently, when there is an unoccupied time i.e., a non-memory access time in the memory device 3 and there is no contention with the normal access, the monitoring unit issues a diagnosis request to the memory command unit 6B. With the issuance of the diagnosis request, the access for checking the data stored in the memory device 3 and the access for a margin test using a logical path in the cache unit 1B are executed.

(3) Based on the diagnosis request from the monitoring unit 8B, the memory command output unit 6B sends an amplitude fluctuation request to the memory device 3. Following the received amplitude fluctuation request, the memory device 3 fluctuates amplitude of the output signals when read data is outputted to the memory control unit 2B.

(4) Based on the diagnosis request from the monitoring unit 8B, the memory command output unit 6B sends a voltage fluctuation request to the power supply control unit 18. Following the received voltage fluctuation request, the power supply control unit 18 fluctuates the voltage level of the power that is supplied to the memory device 3 and the memory control unit 2B.

(5) Based on the diagnosis request from the monitoring unit 8B, the memory command output unit 6B sends a frequency fluctuation request to the clock generating unit 17. Following the received frequency fluctuation request, the clock generating unit 17 fluctuates the clock frequency to be supplied to the memory device 3 and the memory control unit 2B.

(6) Based on the diagnosis request from the monitoring unit 8B, the memory command output unit 6B sends a DLL setting fluctuation request to the DLL unit 19. Following the received DLL setting fluctuation request, the DLL unit 19 fluctuates setting of a delay amount of signals.

(7) Based on the diagnosis request from the monitoring unit 8B, the memory command output unit 6B outputs, to the memory device 3, a command/address for executing the data read from the memory device 3.

(8) Based on the command/address from the memory command output unit 6B, the memory device 3 reads the data stored from the memory area at a specified address, and outputs it to the directional buffer 5 of the memory control unit 2B through a data bus.

(9) In the memory control unit 2B, using the ECC, the ECC error detection/correction unit 10 checks the read data output to the bidirectional buffer 5 from the memory device 3 according to the command/address. If the checking of the ECC error detection/correction unit 10 detects an error in read data, the error status indicating the above point is stored in the error status storage register 14. In addition, if the checking of the ECC error detection/correction unit 10 detects any error that is correctable, the above unit corrects the data, not only outputs the corrected data, but also outputs a rewrite request signal to the rewrite selector 16 and rewrites the data to the memory device 3 through the ECC generating unit 9.

In the margin test, a data error, i.e., detection of an error in the memory control unit 2B occurs, for example, when a condition or value of the characteristic deviates from a reference value. The reference value or the range of operation specification such as amplitude of output signals in the data bus with the memory control unit 2B and the memory device 3 has been designed in advance, and, for example, "±10% from the reference value" corresponds to the range of the operation specification, i.e., the range in which the normal operation is guaranteed. If an actual operation level is within the range of the operation specification although it deviates a little from the reference value, no error is detected. Since the margin test fluctuates the conditions or values of respective characteristics and checks their responses, when the operation level largely deviates from or exceeds the reference value within the range of the operation specification, for example, the ECC error detection/correction unit 10 detects the error and such a case can be disqualified.

Thus, the margin test can be conducted by executing the diagnosis access while the normal memory access is not made, and instability of each characteristic can be detected. In addition, since this function is controlled by hardware of the memory control unit, performance of data transfer in the normal access can be maintained.

A margin test of each characteristic such as the amplitude, etc. can be configured or executed in combination. For example, the cache unit 1B may have the configuration for making the diagnosis of only one of the characteristics.

Alternatively, the cache unit 1B may have the configuration in which the diagnosis of one or more characteristics can be executed and thus the diagnoses of one or more characteristic can be selectively made. In addition, the respective fluctuation requests in the process procedures (3) to (6) may be issued in arbitrary sequence.

Figure 9:
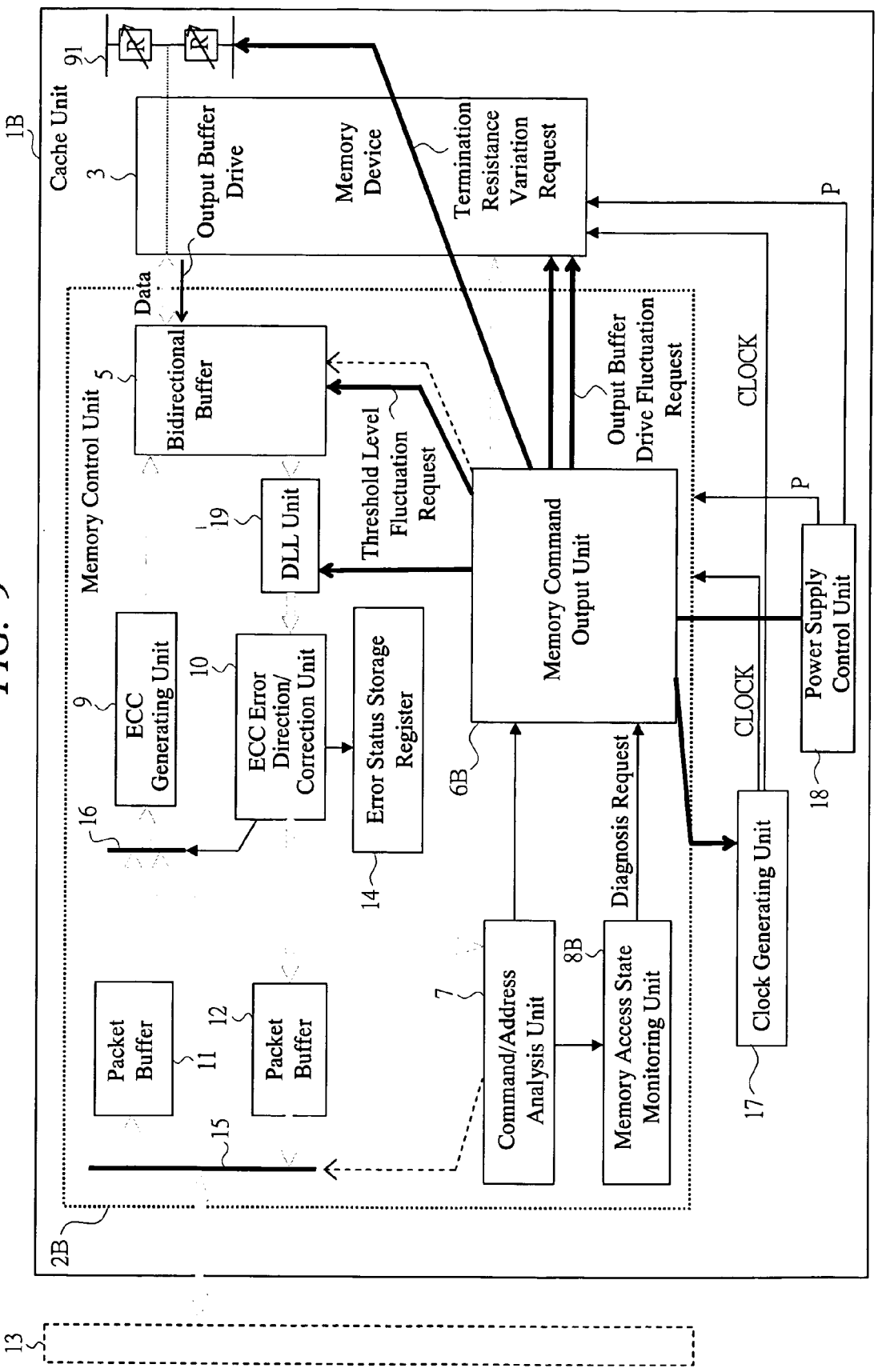
FIG. 9 is a view showing, as a modified example of a cache unit in a disk array subsystem according to another embodiment of the present invention, a detailed configuration of a cache unit corresponding to a configuration for making a margin test of another type.

Next, as a modified example of the second embodiment, FIG. 9 shows a detailed configuration of the cache unit 1B corresponding to the configuration that executes a margin test of a different type in addition to the configuration shown in FIG. 8.

According to the configuration shown in FIG. 9, the margin test that fluctuates a threshold level in the amplitude of the output signal in the data bus, output buffer drive, and termination resistance of the memory device 3 as further characteristics to be subject to the margin test of the memory device 3. Similarly to the configuration of FIG. 8, in the diagnosis access, the memory control unit 2B controls fluctuations based on the diagnosis request from the monitoring unit 8B by issuing, from the memory command output unit 6B, a request (control signal) for fluctuating the conditions or values of respective characteristics within the range of the operation specification, and carries out the margin test to check the responses therefrom, similarly using the ECC.

In FIG. 9, respective elements of the cache unit 1B are equipped with the same functions as those shown in FIG. 8. In addition, the memory command output unit 6B can output a threshold level fluctuation request to the bidirectional buffer 5 based on the diagnosis request from the monitoring unit 8B. In addition, it can also output an output buffer drive fluctuation request to the memory device 3. It can also output a termination resistance fluctuation request to the termination resistance unit 91 of the memory device 3.

The threshold level (also referred to as "reference level") in the amplitude of output signals in the data bus is determined by the bidirectional buffer 5, depending on the settings. According to the threshold level fluctuation request, the threshold level settings at the bidirectional buffer 5 are fluctuated.

In addition, the output buffer drive in the data bus is driving of the output to the bidirectional buffer 5 of the memory control unit 2B from the memory device 3. In response to the output buffer drive, a rising portion of waveform of an output signal may be sharp or gradual. The memory device 3 fluctuates the output buffer drive according to the output buffer drive fluctuation request.

In addition, the termination resistance unit 91 has termination resistance for preventing deformation of waveform that is connected to the memory control unit 2B and the memory device 3. Termination resistance of the termination resistance unit 91 is capable of preventing waveform deformation resulting from reflection action in the bus in which the memory control unit 2B and the memory device 3 are connected. The termination resistance unit 91 has a termination resistance value fluctuating in accordance with the termination resistance fluctuation request from the memory command output unit 6B.

The cache unit 1B carries out the margin tests on respective characteristics such as threshold levels in the amplitude of output signals, output buffer drives, and termination resistance of memory device 3, similarly to the processes described in the process procedure (1) to (9). Similarly, the margin tests of respective characteristics can also be configured and executed in combination.

Thus, in the second embodiment, since the margin tests on respective characteristics of the memory device 3 can be carried out during the normal operation, the rate of detecting data errors can be increased, and, as compared with the configuration in which the margin test is not conducted, a disk array subsystem with more enhanced reliability can be provided. In addition, conventionally, as a test at shipment from the factory of the disk array subsystems, although a margin test that checks the normal operation of the cache unit 201 by fluctuating values of temperatures or voltage thereof is conducted, no disk array subsystem capable of carrying out the margin test during the normal operation has been provided.

Third Embodiment

Figure 10:
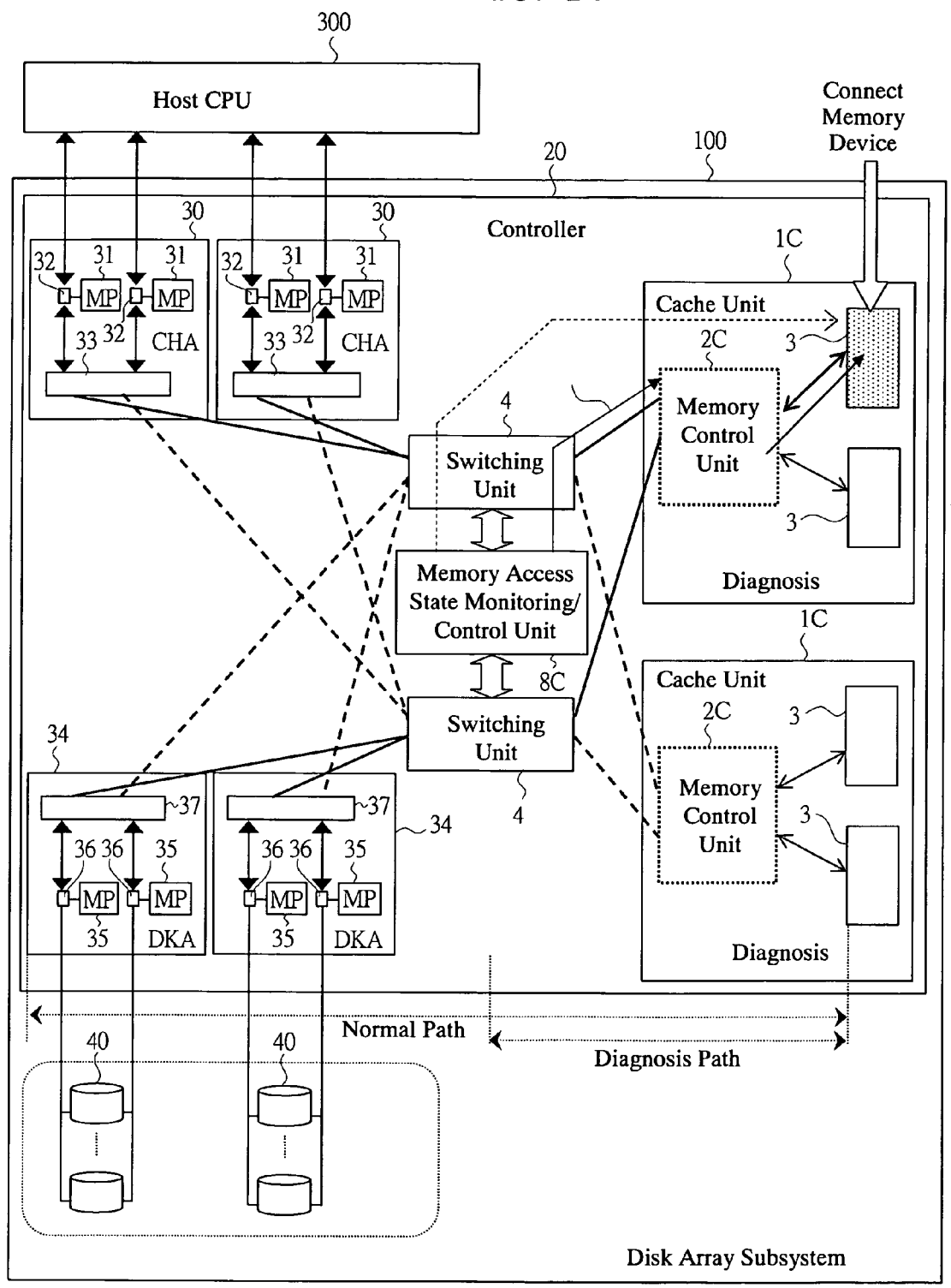
FIG. 10 is a view showing a functional block configuration of a disk array subsystem according to still another embodiment of the present invention and a connection configuration with a host unit.

Next, FIG. 10 shows a functional block configuration of a disk array subsystem 100 according to a third embodiment of the present invention, and the connection configuration with the host unit. The basic configuration of the third embodiment is the same as that of the first embodiment as shown in FIG. 2, and both embodiments differ in configuration related to a diagnosis function.

In the disk array subsystem 100 of the third embodiment, the controller 20 is configured to have the CHA 30, the DKA 34, the switching unit 4, and the cache unit 1C, wherein a diagnosis means is arranged across the cache unit 1C in the controller unit 20 and the outside of the cache unit 1C. In particular, a memory access state monitoring/control unit 8C (hereinafter abbreviated as "monitoring/control unit"), which is a processing unit corresponding-to the monitoring unit 8 in which a primary function of a diagnosis means is provided, is placed to be connected to the switch unit 4 in the controller 20. Alternatively, if the configuration is possible, that is close to this configuration in which the monitoring/control unit 8C is provided in the switching unit 4. The monitoring/control unit 8C assumes a function as a diagnosis control unit to the memory device 3 in the controller 20, and not only monitors the memory access state or controls the timing of making the diagnosis, but also controls the normal memory access related to the diagnosis.

Although the memory control unit 2C of the cache unit 1C has the same configuration as that of the cache unit 1 in FIG. 3, it is configured so that the monitoring unit 8 is not provided. The memory control unit 2 receives the diagnosis request from the switching unit 4 and the side of the C path, the received diagnosis request is inputted to the memory command output unit 6, and the diagnosis access similar to that of the first embodiment is executed in the memory command output unit 6.

In the controller 20, the monitoring/control unit 8C monitors the memory access state to the memory device 3 in the cache unit 1C, i.e., the access to the memory control unit 2C, and controls the memory access related to the diagnosis. The monitoring/control unit 8C recognizes and determines the unoccupied time in the normal memory access by monitoring the switching unit 4. The switching unit 4 keeps track of a use state of path including the P path and the C path. The monitoring/control unit 8C can recognize and determine the memory access state by reading, as information, the use state of the path from the switching unit 4. The monitoring/control unit 8C monitors the memory access state to one or more cache unit 1C through one or more switching unit 4, and determines the timing of making the diagnoses of the respective cache units 1.

The monitoring/control unit 8C judges the timing of making the diagnosis based on monitoring of the memory access state, similarly to the processing in the first embodiment. The monitoring/control unit 8C determines the unoccupied time in the normal memory access. For example, in the process by the monitoring/control unit 8C, based on reception of a normal memory access command to the memory device 3 at the switching unit 4, it issues a diagnosis request to the cache unit 1C from the switching unit 4, the switching unit 4 issues a diagnosis request to the cache unit 1C, after considering the process to the memory device 3 such as read/write, etc. and time, and checking that it is the non-memory access time. The cache unit 1C executes the diagnosis process corresponding to the diagnosis request from the switching unit 4. In addition, in the controller 20, based on the frequency of occurrence of the normal memory access to the cache unit 1C from the processing unit such as the CHA 30, etc., or the calculation such as a rate of the memory access time, a diagnosis request may be issued with such predicted timing that the unoccupied time of a certain length will occur from the statistical viewpoint.

Similarly to the processing in the first embodiment, the monitoring/control unit 8C, as the first diagnosis process, executes the diagnosis access with the regular timing of a fixed period if it is in a non-memory access state. In addition, as the second diagnosis process, the above unit determines, by calculation, a ratio of the non-memory access time to the normal memory access over a period from the current time to a little before certain period of time in the past, and executes the diagnosis access when the value is equal to or more than the predetermined value and provided that the above unit is in the non-memory access state.

As shown in FIG. 10, in the controller 20, there is a logical path (normal path) from the processing units such as the CHA 30 to the memory device 3 of the cache unit 1C, and the normal access is made by using the path. In addition, in the third embodiment, since the diagnosis means is configured in connection with the switching unit 4, there is a logical path from the switching unit 4 to the memory device 3 (diagnosis path), i.e., a logical path from the switching unit 4 to memory control unit 2C within the C path and the cache unit 1C, and the diagnosis access is executed by using the path. Although the path in the cache unit 1C is shared by the normal access and the diagnosis access, the access contention can be avoided on the path, and thus degradation of the normal access can be prevented, because the monitoring/control unit 8C executes control for making the diagnosis access during the unoccupied time in the normal memory access.

In addition, FIG. 10 shows an example in which the monitoring/control unit 8C executes control of the normal memory access and the diagnosis memory access. If a worker adds/replaces a memory device 3 when online connection is established in the cache unit 1C and the new memory device 3 is connected, immediately after this the monitoring/control unit 8C and the memory control unit 2C executes control for adjusting frequency of each memory access in the normal operation and the diagnosis operation to that new memory device 3. In addition, the same control can also be executed in the configuration of the first embodiment.

Immediately after the new memory device 3 is connected to the cache unit 1, the monitoring/control unit 8C executes control on the new memory device 3 of suppression of the normal access and strengthening of diagnosis. By issuing a request to the switching unit 4, the monitoring/control unit 8C not only suppresses the normal access to the new memory device 3 for a certain period of time, but also executes the diagnosis intensively by increasing the frequency of the diagnosis access. After the diagnosis, it returns to the normal control condition again. Similarly, the monitoring/control unit 8C may execute control for decreasing the frequency of diagnosis access to the memory device 3 for a fixed period of time by issuing a request to the switching unit 4.

Thus, by using the third embodiment, the diagnosis can be executed efficiently by positively controlling an access to the memory device 3.

As described above, the invention made by the inventor has been specifically described based on the embodiments. However, needless to say, the present invention is not limited to the above embodiments and can be variously altered and modified without departing from the gist thereof.

The present invention can be applied to an apparatus for making the diagnoses of the memory devices.

What is claimed is:

1. A disk array subsystem having a storage device and a controller, wherein said controller has a cache memory unit, a plurality of host interface units, a plurality of disk interface units, and a switching unit for connecting the cache memory unit, the host interface units, and the disk interface units; and said cache memory unit has a memory device for storing data, and a memory control circuit that controls said memory device, wherein said memory control unit has a memory command output unit, a monitoring unit, an ECC error detection/correction unit, and an error status storage register, the monitoring unit:

monitors a memory access state of the memory device based on memory access commands, determines timing to make a diagnosis access to the memory device based upon said monitored memory access state, and outputs a diagnosis request memory to the command output unit with the timing to make a diagnosis access, determines a non-access time of the memory device when there is no normal data access from the host interface units and the disk interface units thereinto, determines the timing to make a diagnosis access also as a time point when a previous diagnosis access to said the memory device has elapsed for a fixed period of time, or as a time point when a ratio of access time or frequency reaches or exceeds a predetermined value, said ratio is a ratio of a normal memory access time to a non-memory access time during a past time period, or a ratio of the non-memory access time to a total time during the past time period, or a ratio of a normal memory access frequency to a non-memory access frequency during a past time period the past time period, or a ratio of the non-memory access frequency to a total access frequency the past time period, and checks whether any data failure has occurred only during said non-access time of the memory device by having the memory command output unit issue a command/address of the data read to the memory device and checking the read data for responding thereto using the ECC error detection/correction unit, the ECC error detection/correction unit obtains an error status when an error is detected by checking the read data from the memory device, if said detected error is correctable, the data is corrected and the corrected data is rewritten to the memory device, and the error status storage register stores said error status received form the ECC error detection/correction unit.

2. The disk array subsystem according to claim 1, wherein said memory control circuit:
generates and adds an ECC to write data for said memory device, and executing a write process to said memory device;
making an access for said diagnosis, outputting a read command and an address for said diagnosis, executing, by using said ECC, an error detection process to the data read in accordance with said read command and said address from said cache memory device.

3. The disk array subsystem according to claim 1, wherein said memory control circuit makes an access for said diagnosis, and if a memory access command corresponding to said normal access is received during the diagnosis process, stops said diagnosis process and executes said normal access process.

4. The disk array subsystem according to claim 1, wherein said memory control circuit executes control for increasing and/or decreasing the access for said diagnosis depending on said normal access status.

5. The disk array subsystem according to claim 1, wherein said memory control circuit executes control for suppressing said normal access depending on the access for said diagnosis.

6. The disk array subsystem according to claim 1, wherein said memory control circuit makes an access for a margin test, which fluctuates a value of characteristic related to a data input/output of said memory device, while the normal access is not made to said memory device, and checks a responses corresponding to said fluctuation and detects an error.

7. The disk array subsystem according to claim 6, wherein said memory control circuit, as an access for said margin test, executes control for fluctuating an amplitude of an input/output signal in a bus between said memory control circuit and said memory device with respect to on said memory control circuit and said memory device.

8. The disk array subsystem according to claim 6, wherein said memory control circuit, as an access for said margin test, executes control for fluctuating frequency of a supply clock for an input/output signal in a bus between said memory control circuit and said memory device with respect to said memory control circuit and said memory device.

9. The disk array subsystem according to claim 6, wherein said memory control circuit, as an access for said margin test, executes control for fluctuating a voltage level of power supply for an input/output signal in a bus between said memory control circuit and said memory device with respect to said memory control circuit and said memory device.

10. The disk array subsystem according to claim 6, wherein said memory control circuit, as an access for said margin test, executes control for fluctuating a DLL setting for an input/output signal in a bus between said memory control circuit and said memory device with respect to said memory control circuit and said memory device.

11. The disk array subsystem according to claim 6, wherein said memory control circuit, as an access for said margin test, executes control for fluctuating a threshold level for an input/output signal in a bus between said memory control circuit and said memory device with respect to said memory control circuit and said memory device.

12. The disk array subsystem according to claim 6, wherein said memory control circuit, as an access for said margin test, executes control for fluctuating an output buffer drive for an input/output signal in a bus between said memory control circuit and said memory device with respect to said memory control circuit and said memory device.

13. The disk array subsystem according to claim 6, wherein said memory control circuit, as an access for said margin test, executes control for fluctuating termination resistance for an input/output signal in a bus between said memory control circuit and said memory device with respect to said memory control circuit and said memory device.

14. The disk array subsystem according to claim 1, wherein said memory control circuit further comprises:
a bus, a selector, and a buffer related to various types of transfer of data including a command, an address, and read/write data between the outside and said memory device;
an analysis unit that analyzes the command/address related to an access with respect to said memory device based on data received; and
an ECC generating unit that generates/adds an ECC for write data to said memory device.

15. A disk array subsystem having a storage device and a controller,
wherein said controller having a plurality of host interface units, a plurality of disk interface units, a cache unit, a switching unit for connecting for connecting the cache unit, the host interface units, and the disk interface units, and a diagnosis control unit connected to said switching unit; and
said cache unit has a memory device for storing data and a memory control circuit that controls said memory device,
wherein said memory control unit has a memory command output unit, an ECC error detection/correction unit, and an error status storage register,
wherein said diagnosis control unit;
monitors a memory access state of the memory device based on memory access commands, determines timing to make a diagnosis access to the memory device based upon said monitored memory access state, and outputs a diagnosis request memory to the command output unit with the timing to make a diagnosis access,
determines a non-access time of the memory device when there is no normal data access from the host interface units and the disk interface units thereinto,
determines the timing to make a diagnosis access also as a time point when a previous diagnosis access to said the memory device has elapsed for a fixed period of time, or as a time point when a ratio of access time or frequency reaches or exceeds a predetermined value, said ratio is a ratio of a normal memory access time to a non-memory access time during a past time period, or a ratio of the non-memory access time to a total time during the past time period, or a ratio of a normal memory access frequency to a non-memory access frequency during a past time period the past time period, or a ratio of the non-memory access frequency to a total access frequency the past time period, and
checks whether any data failure has occurred only during said non-access time of the memory device by having the memory command output unit issue a command/address of the data read to the memory device and checking the read data for responding thereto using the ECC error detection/correction unit,
the ECC error detection/correction unit obtains an error status when an error is detected by checking the read data from the memory device, if said detected error is correctable, the data is corrected and the corrected data is rewritten to the memory device, and the error status storage register stores said error status received form the ECC error detection/correction unit.

16. The disk array subsystem according to claim 15, wherein said diagnosis control unit, based on said monitoring and depending on said normal access status, executes control for increasing and/or decreasing the access for diagnosis to the memory device in said cache unit through said switching unit.

17. The disk array subsystem according to claim 15, wherein said diagnosis control unit, based on said monitoring and depending on an access status for said diagnosis, executes control for suppressing a normal access to the memory device in said cache unit through said switching unit.

18. The disk array subsystem according to claim 15, wherein said diagnosis control unit executes control for suppressing a normal access to the memory device for a fixed time immediately after said memory device is connected in said cache unit, and increase the access for said diagnosis.

* * * * *